(12) United States Patent
Higashide et al.

(10) Patent No.: US 12,039,870 B2
(45) Date of Patent: Jul. 16, 2024

(54) OPERATION MANAGEMENT APPARATUS AND OPERATION MANAGEMENT METHOD OF AUTONOMOUS TRAVEL VEHICLE

(71) Applicants: TOYOTA JIDOSHA KABUSHIKI KAISHA, Toyota (JP); DENSO CORPORATION, Kariya (JP)

(72) Inventors: Hiroshi Higashide, Toyota (JP); Kenji Okazaki, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 517 days.

(21) Appl. No.: 17/195,078

(22) Filed: Mar. 8, 2021

(65) Prior Publication Data
US 2021/0312813 A1 Oct. 7, 2021

(30) Foreign Application Priority Data
Apr. 2, 2020 (JP) .................................. 2020-066700

(51) Int. Cl.
*G08G 1/00* (2006.01)
*G05D 1/00* (2024.01)
(Continued)

(52) U.S. Cl.
CPC ........... *G08G 1/202* (2013.01); *G05D 1/0297* (2013.01); *G06Q 10/06312* (2013.01); *G06Q 10/06315* (2013.01); *G08G 1/127* (2013.01)

(58) Field of Classification Search
CPC . G08G 1/202; G05D 1/0297; G06Q 10/06312
See application file for complete search history.

(56) References Cited

U.S. PATENT DOCUMENTS

| 8,504,402 B1* | 8/2013 | Tiao ....................... G06Q 10/06 705/7.29 |
| 2015/0360706 A1* | 12/2015 | Niinomi .................. B61L 27/12 701/19 |

(Continued)

FOREIGN PATENT DOCUMENTS

| CN | 110304117 A | 10/2019 |
| JP | 2000-264210 A | 9/2000 |

OTHER PUBLICATIONS

"Application of Function for Equal Interval Operation in Vehicle Operating Organization". China New Technologies and Products, 2009, No. 23, p. 99.

(Continued)

*Primary Examiner* — Maceeh Anwari
*Assistant Examiner* — Aarron E Santos
(74) *Attorney, Agent, or Firm* — Oliff PLC

(57) ABSTRACT

An introduction necessity judgment unit judges necessity of introduction of an additional vehicle to a circuit based on a boarding demand on the circuit, and outputs an introduction request command when judging that the introduction is necessary. Upon reception of the introduction request command, an introduction timing determiner outputs an introduction command to the additional vehicle when a maximum value of actual operation intervals of operating vehicles is greater than or equal to an interval threshold determined according to a target velocity, and outputs a hold command to the additional vehicle for putting introduction to the circuit on-hold when the maximum value is less than the interval threshold $Dr\_th$.

2 Claims, 16 Drawing Sheets

(51) Int. Cl.
*G06Q 10/0631* (2023.01)
*G08G 1/127* (2006.01)

(56) References Cited

U.S. PATENT DOCUMENTS

2019/0265703 A1\* 8/2019 Hicok .................... G05D 1/249
2020/0357091 A1\* 11/2020 Minakawa ............. B61L 27/14
2021/0312807 A1\* 10/2021 Okazaki ................ G08G 1/127

OTHER PUBLICATIONS

Guo, Jian. "Optimization of Constant Headway Regulation Method in Urban Rail Transit". Railway Transport and Economy, 11th Term, 2016, pp. 87-92.
Chen, Fu-gui et al. "Research on the Principle of System Capacity Loss in the Mode of Express/Slow Urban Rail Transit". Journal of Railway Engineering Society, Dec. 2014, No. 12, pp. 96-100.

\* cited by examiner

OPERATION MANAGEMENT APPARATUS AND OPERATION MANAGEMENT METHOD OF AUTONOMOUS TRAVEL VEHICLE

CROSS REFERENCE TO RELATED APPLICATION

This application claims priority to Japanese Patent Application No. 2020-066700 filed on Apr. 2, 2020, which is incorporated herein by reference in its entirety including the specification, claims, drawings, and abstract.

TECHNICAL FIELD

The present disclosure relates to an operation management apparatus and an operation management method for an autonomous travel vehicle, for managing operations of a plurality of vehicles which autonomously travel on a circuit on which a plurality of stops are provided.

BACKGROUND

In recent years, a transportation system has been proposed which uses a vehicle which can travel autonomously. For example, JP 2000-264210 A discloses a vehicle transportation system which uses a vehicle which can travel autonomously along a dedicated path. This vehicle transportation system comprises a plurality of vehicles which travel along the dedicated path, and a supervision and control system which enables operations of the plurality of vehicles. The supervision and control system transmits a departure command and a course command to the vehicle according to an operation plan. The supervision and control system also increases or decreases a number of the vehicles according to a boarding demand.

The present disclosure provides an operation management apparatus and an operation management method of autonomous travel vehicles which enables introduction of an additional vehicle at an appropriate timing, according to an operation situation on a circuit.

SUMMARY

According to one aspect of the present disclosure, there is provided an operation management apparatus of a plurality of autonomous travel vehicles which autonomously travel on a circuit. The operation management apparatus comprises: an operation schedule provider; an introduction necessity judgement unit; and an introduction timing determiner. The operation schedule provider provides, to each of a plurality of operating vehicles which are autonomously traveling on the circuit, a normal operation schedule in which an arrival target time and a departure target time to and from a stop provided along the circuit, and a target velocity of each of the operating vehicles, are determined so that operation intervals of the plurality of operating vehicles are equal to each other. The introduction necessity judgment unit judges necessity of introduction of an additional vehicle to the circuit based on a boarding demand on the circuit, and outputs an introduction request command when judging that the introduction is necessary. Upon reception of the introduction request command, the introduction timing determiner outputs an introduction command to the additional vehicle when a maximum value of actual operation intervals of the operating vehicles is greater than or equal to an interval threshold determined according to the target velocity, and outputs a hold command to the additional vehicle for putting the introduction to the circuit on-hold when the maximum value is less than the interval threshold.

According to the above-described structure, when the actual operation interval of the plurality of operating vehicles which are traveling on the circuit is greater than or equal to the interval threshold, that is, when the actual operation interval is relatively long, an additional vehicle is introduced to the circuit. On the other hand, according to the above-described structure, when the actual operation interval is less than the interval threshold, that is, when the actual operation interval is relatively short, even if the introduction request command is output, the introduction of the additional vehicle to the circuit is put on-hold. In this manner, according to the above-described structure, the additional vehicle can be introduced at an appropriate timing, according to the operation situation on the circuit.

According to another aspect of the present disclosure, the operation management apparatus may further comprise a schedule changer that changes an operation schedule to be provided to each of the plurality of operating vehicles from the normal operation schedule. In this case, the schedule changer executes a post-introduction change process in which the departure target time of an operating vehicle which is one vehicle preceding the additional vehicle introduced to the circuit based on the introduction command is advanced from the departure target time determined based on the normal operation schedule, and the departure target time of an operating vehicle which is one vehicle following the additional vehicle is delayed from the departure target time determined based on the normal operation schedule.

When the additional vehicle is introduced to the circuit, operation intervals between the additional vehicle and the operating vehicles in front of and behind the additional vehicle are shortened. According to the above-described structure, the post-introduction change process is executed, which moves the operating vehicles in front of and behind the additional vehicle farther away from the additional vehicle. With this process, the operation intervals of the operating vehicles including the additional vehicles can be again set to an equal interval.

According to another aspect of the present disclosure, the operation management apparatus may further comprise a schedule changer that changes an operation schedule to be provided to each of the plurality of operating vehicles from the normal operation schedule. In this case, the schedule changer executes a pre-introduction change process based on the hold command, in which the departure target time is changed from the departure target time determined based on the normal operation schedule so that the operation intervals between the plurality of operating vehicles are not equal, to thereby enlarge an inter-vehicle space between predetermined operating vehicles for the additional vehicle.

According to the above-described structure, when the actual operation interval is less than the interval threshold and the introduction to the circuit is put on-hold, the operation schedules of the operating vehicles which are traveling on the circuit are changed so that the intervals become unequal to each other. With this process, the operation interval is enlarged between predetermined operating vehicles, and introduction of the additional vehicle becomes possible.

According to another aspect of the present disclosure, there is provided an operation management method of a plurality of autonomous travel vehicles which autonomously travel on a circuit. In the operation management method, a normal operation schedule is provided to each of a plurality of operating vehicles which are autonomously traveling on the circuit, in which an arrival target time and a departure target time to and from a stop provided along the circuit, and a target velocity of each of the operating vehicles, are determined so that operation intervals of the plurality of operating vehicle are the same. In addition, necessity of introduction of an additional vehicle to the circuit is judged based on a boarding demand on the circuit, and an introduction request command is output when it is judged that the introduction is necessary. Further, when the introduction request command is received, an introduction command is output to the additional vehicle if a maximum value of actual operation intervals of the operating vehicles is greater than or equal to an interval threshold determined according to the target velocity. On the other hand, if the maximum value is less than the interval threshold, a hold command is output to the additional vehicle for putting the introduction to the circuit on-hold.

According to another aspect of the present disclosure, in the above-described configuration, a post-introduction change process may be executed in which the departure target time of an operating vehicle which is one vehicle ahead of the additional vehicle introduced to the circuit based on the introduction command is advanced from the departure target time determined based on the normal operation schedule, and the departure target time of an operating vehicle which is one vehicle behind the additional vehicle is delayed from the departure target time determined based on the normal operation schedule.

According to another aspect of the present disclosure, in the above-described configuration, a pre-introduction change process may be executed based on the hold command, in which the departure target time is changed from the departure target time determined based on the normal operation schedule so that operation intervals of the plurality of operating vehicles are unequal intervals from each other, to thereby enlarge an inter-vehicle space between predetermined operating vehicles for the additional vehicle. According to various aspects of the present disclosure, introduction of an additional vehicle at an appropriate timing according to an operation situation on the circuit can be enabled.

BRIEF DESCRIPTION OF DRAWINGS

Embodiment(s) of the present disclosure will be described based on the following figures, wherein.

DESCRIPTION OF EMBODIMENTS

Figure 1:
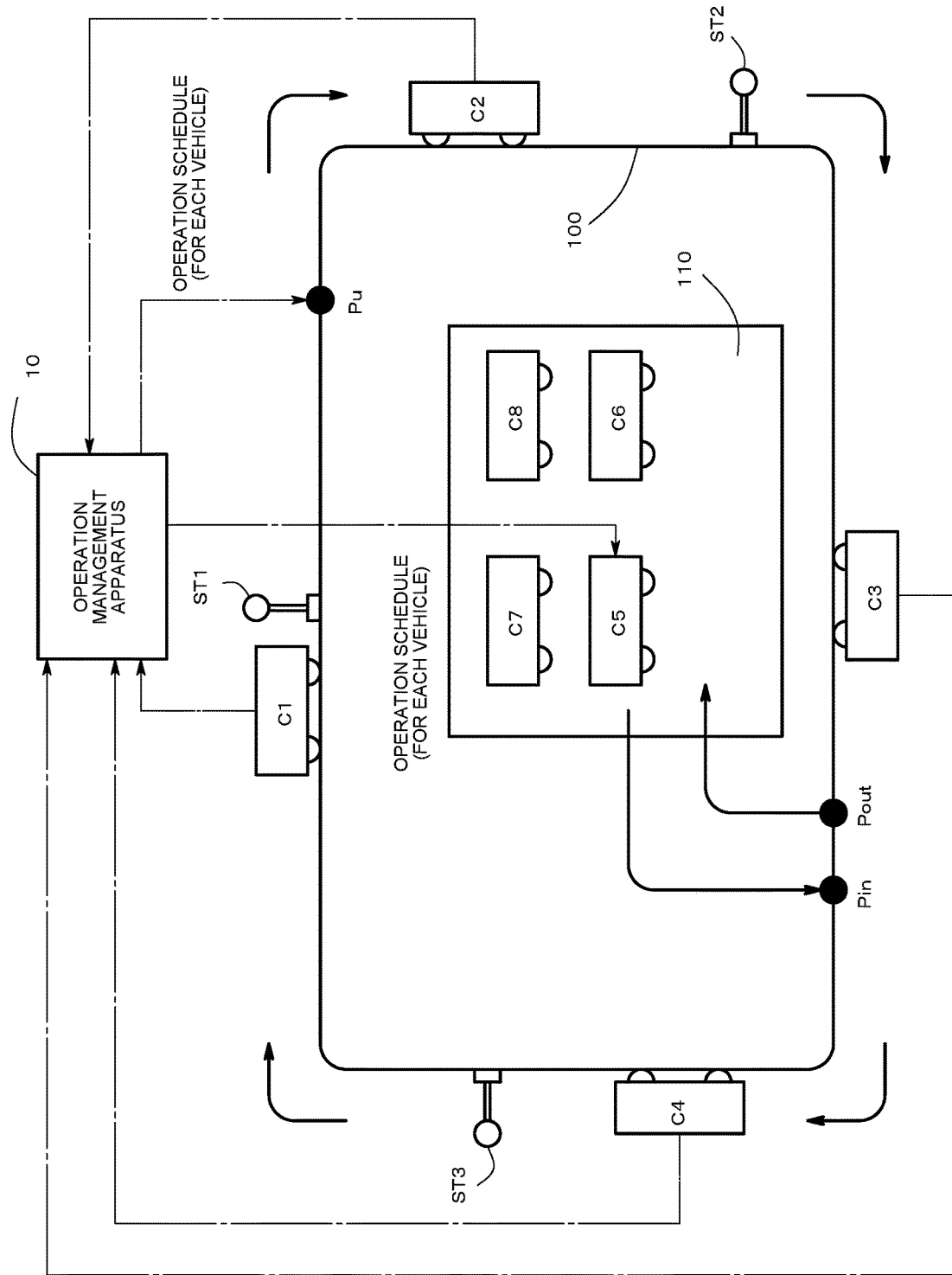
FIG. 1 is a schematic diagram of a transportation system in which an operation management apparatus according to an embodiment of the present disclosure is provided.

FIG. 1 is a schematic diagram which exemplifies a transportation system including an operation management apparatus 10 according to an embodiment of the present disclosure. The transportation system includes, in addition to the operation management apparatus 10, operating vehicles C1~C4, waiting vehicles C5~C8, and stops ST1~ST3. In the following description, when the plurality of vehicles C1~C8 are not to be distinguished, the index for distinguishing the vehicles may be omitted, and a vehicle may be simply described as ☐vehicle C☐ Similarly, when the plurality of stops ST1~ST3 do not need to be distinguished, a stop may be simply described as ☐stop ST☐

In the transportation system exemplified in FIG. 1, the vehicle C travels along a circuit 100 which is predefined, and an unspecified large number of users are transported. The vehicle C circulatory operates in a one-way travel on the circuit 100, as shown by an arrow in the figure.

The circuit 100 may be a dedicated road, for example, on which only the vehicles C are allowed to travel. When the vehicle C is a railroad vehicle, the circuit 100 may be a circulating line (Loop line). Alternatively, the circuit 100 may be a road segment which is set on a normal road on which vehicles other than the vehicles C can travel.

In addition, a shed 110 is provided on the transportation system, connected to the circuit 100. In FIG. 1, waiting vehicles C5~C8 waiting in the shed 110 are shown. Among the waiting vehicles, an additional vehicle to be additionally introduced to the circuit 100 (for example, the waiting vehicle C5) is selected.

As connection points with the shed 110, a retrieval point Pout and an introduction point Pin are provided on the circuit 100. In the example configuration of FIG. 1, the retrieval point Pout and the introduction point Pin are provided between the stops ST2 and ST3.

The operating vehicles C1~C4 traveling on the circuit 100 enter the shed 110 at the retrieval point Pout. The waiting vehicles C5~C8 waiting in the shed 110 are introduced into the circuit 100 from the introduction point Pin. In order to avoid crossover between a vehicle C to be retrieved and a vehicle C to be introduced, the retrieval point Pout is provided upstream of the introduction point Pin.

Further, an operation schedule updating point Pu is provided on the circuit 100, for sending an operation schedule of each vehicle to each of the operating vehicles C1~C4. At the schedule updating point Pu, an operation schedule for one lap starting from the operation schedule updating point Pu, for the vehicle C passing the point Pu, is provided from the operation management apparatus 10 to the vehicle C. In this manner, in the vehicle C, the operation schedule is changed every time the vehicle C passes the schedule updating point Pu (that is, for each lap). Details of a method of providing the operation schedule will be described later.

<Structure of Stop>

A plurality of stops ST are provided along the circuit 100. FIG. 1 exemplifies three stops ST1~ST3, but the number is not limited to three, and an arbitrary number of stops are provided on the circuit 100 according to an overall length of the circuit 100, buildings along the circuit 100, or the like. For example, the stop ST is provided erected on a walkway at a side of a roadway on which the operating vehicles C1~C4 travel. The stop ST can communicate with the operation management apparatus 10, for example, via a dedicated communication line or the like. Further, the stop ST can wirelessly communicate with the vehicles C.

Figure 2:
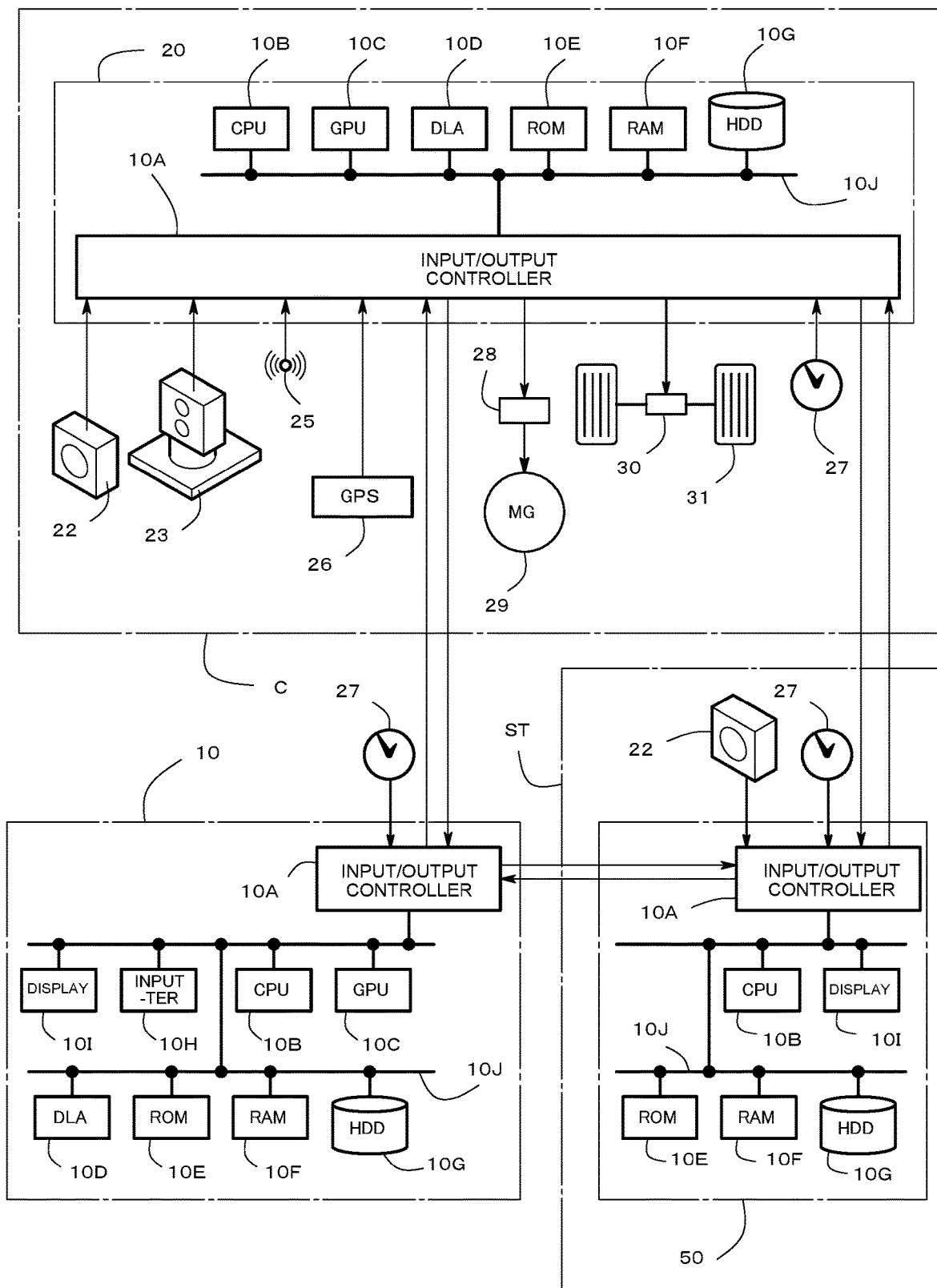
FIG. 2 is a hardware structure diagram of an operation management apparatus, an autonomous travel vehicle, and a stop.

FIG. 2 exemplifies hardware structures of the stop ST, the vehicle C, and the operation management apparatus 10. The stop ST includes a camera 22, a clock 27, and a controller 50. The camera 22 is for taking pictures of passengers waiting the vehicle C at the stop ST, and can take, for example, at least one of a still image or a video image of a periphery of the stop ST.

The controller 50 has, as a hardware structure, an input/output controller 10A, a CPU 10B, a ROM 10E, a RAM 10F, a hard disk drive 10G (HDD), and a display 10I, and these constituent components are connected to an internal bus 10J.

Figure 3:
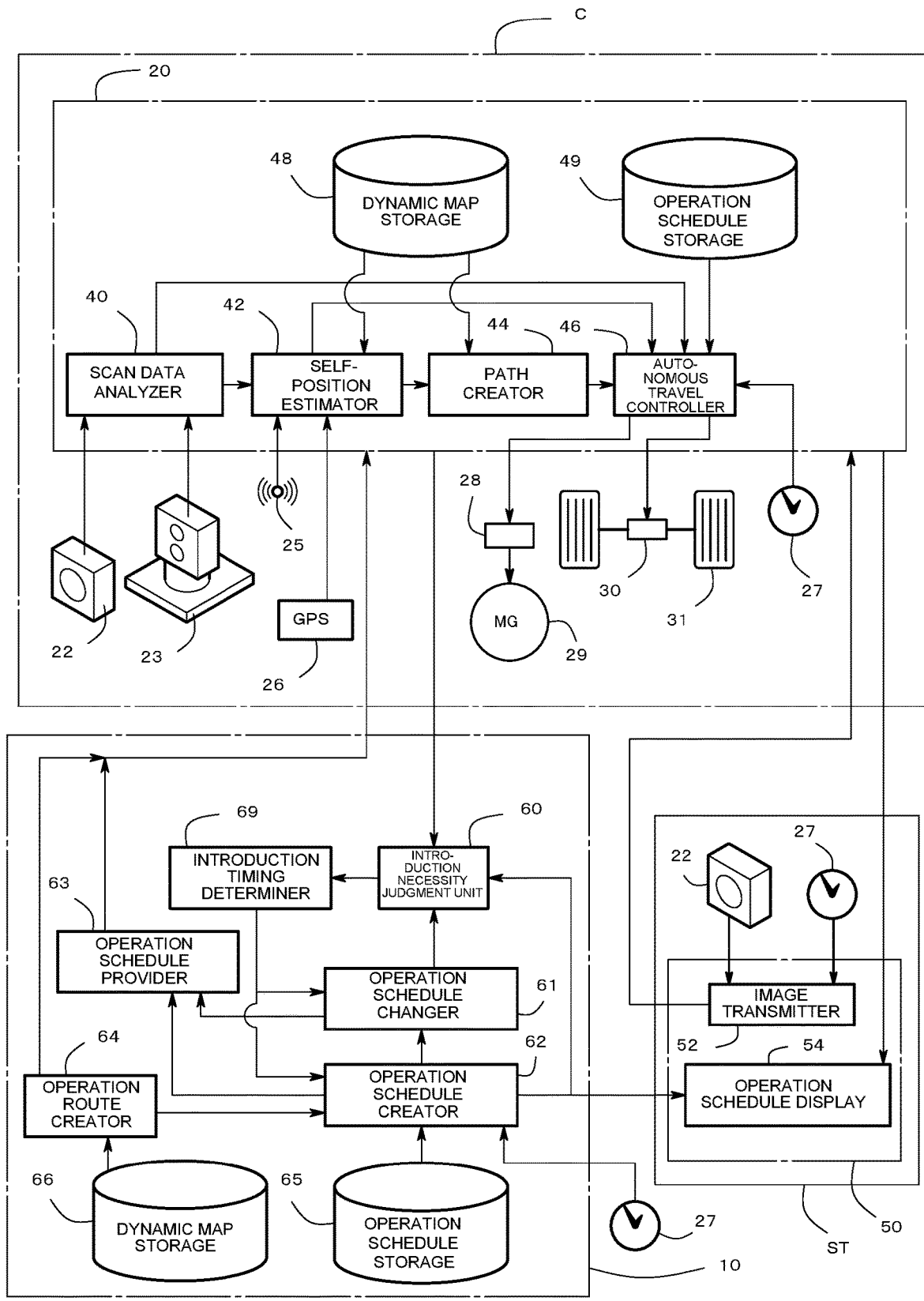
FIG. 3 is a functional block diagram of an operation management apparatus, an autonomous travel vehicle, and a stop.

FIG. 3 exemplifies functional blocks of the stop ST, the vehicle C, and the operation management apparatus 10 in a state of being mixed with the hardware. The controller 50 of the stop ST has, as functional blocks, an image transmitter 52, and an operation schedule display 54.

The image transmitter 52 transmits image data of the periphery of the stop ST captured by the camera 22 to the vehicle C along with time data obtained from the clock 27. The transmitted image data and time data are used for calculating a loading/unloading completion time Tp, to be described later. The operation schedule of the vehicle C is sent from the operation management apparatus 10 to the operation schedule display 54. For example, the operation schedule which is updated every predetermined time period is transmitted from the operation management apparatus 10 to the controller 50. Upon reception of the schedule, the operation schedule display 54 displays a planned arrival time (arrival target time Ta* to be described later) of the vehicle C which will arrive at the stop ST.

<Structure of Vehicle>

The vehicle C is a vehicle which can autonomously travel on the circuit 100, and functions as, for example, a shared vehicle which transports an unspecified large number of users from a predetermined stop ST to another stop ST. The vehicle C may be, for example, an autobus. As exemplified in FIGS. 2 and 3, the vehicle C is an electricity-driven vehicle which has a rotary electric machine 29 (motor) as a drive source, and a battery (not shown) as a power supply. The vehicle C can communicate with, that is, exchange data with, the operation management apparatus 10 and the stop ST via wireless communication.

The vehicle C is equipped with various mechanisms for enabling the autonomous travel. Specifically, the vehicle C includes a controller 20, a camera 22, a lidar unit 23, a proximity sensor 25, a GPS receiver 26, a clock 27, a drive mechanism 28, and a steering mechanism 30.

The camera 22 images a field of view which is approximately identical to that of the lidar unit 23. The camera 22 has an image sensor such as, for example, a CMOS sensor, a CCD sensor, or the like. An image captured by the camera 22 (captured image) is used for the autonomous travel control, as will be described below.

The lidar unit 23 (LIDAR Unit) is a sensor for autonomous travel, and is, for example, a distance measurement sensor which uses infrared. For example, an infrared laser light ray is scanned from the lidar unit 23 in a horizontal direction and in a vertical direction, so that three-dimensional point group data can be obtained in which distance measurement data for a peripheral environment of the vehicle C are three-dimensionally arranged. The camera 22 and the lidar unit 23 are provided as a collective sensor unit, for example, on four surfaces including a front surface of the vehicle C, a rear surface, and respective side surfaces connecting the front surface and the rear surface.

The proximity sensor 25 is, for example, a sonar sensor, and detects, for example, a distance between a curb, which is a boundary between the roadway and the walkway, and the vehicle C, when the vehicle C stops at the stop ST. This detection enables stopping with the vehicle C pulled over near the curb, a process commonly known as precise docking. The proximity sensor 25 is provided, for example, on respective side surfaces and on corners of the front surface and the side surfaces of the vehicle C.

The GPS receiver 26 receives a position measurement signal from a GPS satellite. For example, with the reception of the position measurement signal, a current position (latitude and longitude) of the vehicle C is determined.

The controller 20 may be, for example, an electrical control unit (ECU) of the vehicle C, and is formed from a computer. The controller 20 exemplified in FIG. 2 includes an input/output controller 10A which controls input and output of data. In addition, the controller 20 includes, as computing elements, a CPU 10B, a GPU 10C (Graphics Processing Unit), and a DLA 10D (Deep Learning Accelerator). Further, the controller 20 includes, as storage units, a ROM 10E, a RAM 10F, and a hard disk drive 10G (HDD). These constituent components are connected to an internal bus 10J.

FIG. 3 shows functional blocks of the controller 20. The functional blocks include a scan data analyzer 40, a self-position estimator 42, a path creator 44, and an autonomous travel controller 46. Moreover, the controller 20 includes, as storage units, a dynamic map storage 48, and an operation schedule storage 49.

The dynamic map storage 48 stores dynamic map data of the circuit 100 and a periphery thereof. The dynamic map is a three-dimensional map, and stores, for example, a position and a shape (three-dimensional shape) of the road (roadway and walkway). In addition, positions of a traffic lane, a crosswalk, a stop line, or the like drawn on the road are also stored in the dynamic map. In addition, a position and a shape (three-dimensional shape) of a building and constructions such as a signal light for vehicle are also stored in the dynamic map. The dynamic map data is provided from the operation management apparatus 10.

The operation schedule storage 49 stores an operation schedule of the vehicle C equipped with the storage. As described above, the operation schedule is updated once per lap at the operation schedule updating point Pu (refer to FIG. 1).

The vehicle C autonomously travels along the data of the circuit 100 stored in the dynamic map storage 48. In the autonomous travel, the three-dimensional point group data of the peripheral environment of the vehicle C is acquired by the lidar unit 23. In addition, the image of the peripheral environment of the vehicle C is captured by the camera 22.

An object in the captured image captured by the camera 22 is analyzed by the scan data analyzer 40. For example, an object in the captured image is detected by known deep learning methods such as SSD (Single Shot Multibox Detector) and YOLO (You Only Look Once) using supervised learning, and attributes of the detected object (such as a stop ST, a passerby, a construction, or the like) are recognized.

In addition, the scan data analyzer 40 acquires the three-dimensional point group data (lidar data) from the lidar unit 23. By overlapping the captured image of the camera 22 and the lidar data, it becomes possible to determine what object of what attribute (a stop ST, a passerby, a construction, or the like) is positioned at what distance from the vehicle.

The self-position estimator 42 estimates a self position (own position) in the dynamic map based on a self position (latitude and longitude) received from the GPS receiver 26. The estimated self position is used for the path creation, and is also transmitted to the operation management apparatus 10 along with time information acquired from the clock 27.

The path creator 44 creates a path from the estimated self position to a nearby target point. For example, a path from the self position to the stop ST is created. When it becomes certain that an obstacle exists on a straight-line path from the self position to the stop ST based on the three-dimensional point group data by the lidar unit 23 and the captured image by the camera 22, a path is created to avoid the obstacle.

The autonomous travel controller 46 executes travel control of the vehicle C based on the overlap data of the captured image and the lidar data, the self position, the path which is already created, and the operation schedule, determined as above. For example, a traveling velocity on the path which is already created is autonomously controlled to match with a target velocity V1 (to be described later) determined by the operation schedule. For example, the autonomous travel controller 46 controls the drive mechanism 28 such as an inverter, to maintain the velocity of the vehicle C at the target velocity V1. In addition, the autonomous travel controller 46 operates a wheel 31 through control of the steering mechanism 30 such as an actuator, to control the vehicle C to proceed on the determined path.

At the stop ST, the autonomous travel controller 46 opens a loading/unloading door (not shown) after stopping the vehicle C. In this process, the autonomous travel controller 46 refers to the clock 27, and transmits an actual arrival time Ta, which is a time when the vehicle C has actually arrived at the stop ST, to the operation management apparatus 10. Moreover, the autonomous travel controller 46 refers to the clock 27, and maintains the vehicle C at a stopped state until a departure target time Td* (to be described later) determined by the operation schedule is reached.

Further, when a loading (or embarking) passenger still remains at the stop ST or when an unloading passenger from the vehicle C still remains even after the departure target time Td*, the stopped state of the vehicle C is maintained. When it is judged that there are no more loading/unloading passengers, the autonomous travel controller 46 closes the loading/unloading door (not shown), and applies travel control so that the vehicle C moves away from the stop ST. In this process, the autonomous travel controller 46 refers to the clock 27, and transmits an actual departure time Td, which is a time when the vehicle C has actually departed from the stop, to the operation management apparatus 10.

As a way of judging whether or not a loading passenger still remains (a line is still formed) at the stop ST, for example, the camera 22 and the lidar unit 23 which are provided outside of the vehicle C are used. For example, with the overlap data of the captured image and the lidar data, judgment of presence or absence of the loading passenger at the stop ST may be enabled. Alternatively, a captured image by the camera 22 of the stop ST may be received and the image may be analyzed by the scan data analyzer 40, to thereby enable judgment of the presence or absence of the loading passengers at the stop ST.

The scan data analyzer 40 compares, for example, a loading completion time determined based on the overlap data of the captured image by the camera 22 of the vehicle C and the lidar data by the lidar unit 23, and a loading completion time determined based on the captured image by the camera 22 of the stop ST. For example, the scan data analyzer 40 sets a later time of these two times, that is, a time at which the loading has reliably been completed in consideration of these times, as a true loading completion time.

Further, as a method of judging whether or not an unloading (or disembarking) passenger still remains in the vehicle C, for example, an image captured by a camera provided inside the vehicle C (not shown) is used. For example, captured image of the inside of the vehicle cabin is analyzed by the scan data analyzer 40, and presence or absence of the unloading passenger is determined. The scan data analyzer refers to the clock 27, and sets a time when the unloading is completed as an unloading completion time.

In addition, the scan data analyzer 40 transmits, to the operation management apparatus 10, a later one of the true loading completion time and the unloading completion time described above, for example, as a loading/unloading completion time Tp, which is a time when the loading and the unloading are completed at the stop ST.

<Structure of Operation Management Apparatus>

The operation management apparatus 10 manages the operations of the vehicles C which autonomously travel on the circuit 100. The operation management apparatus 10 is placed, for example, in a management company which manages the operations of the vehicles C. The operation management apparatus 10 is formed from, for example, a computer. FIG. 2 exemplifies a hardware structure of the operation management apparatus 10.

Similar to the hardware structure of the vehicle C, the operation management apparatus 10 comprises an input/output controller 10A, a CPU 10B, a GPU 10C, a DLA 10D, a ROM 10E, a RAM 10F, and a hard disk drive 10G (HDD). These constituent components are connected to an internal bus 10J.

The operation management apparatus 10 further comprises an inputter 10H such as a keyboard and a mouse, for inputting data as necessary. The operation management apparatus 10 further comprises a display 10I such as a display device for graphically displaying the operation schedule or the like. The inputter 10H and the display 10I are connected to the internal bus 10J.

FIG. 3 shows functional blocks of the operation management apparatus 10. The operation management apparatus 10 includes, as storage units, an operation schedule storage 65 and a dynamic map storage 66. In addition, the operation management apparatus 10 includes, as functional units, an introduction necessity judgment unit 60, an operation schedule changer 61, an operation schedule creator 62, an operation schedule provider 63, an operation route creator 64, and an introduction timing determiner 69.

The operation route creator 64 creates a route on which the vehicle C is to travel, that is, the circuit 100. For example, a path is selected from a road which includes a branch, to create the circuit 100. Dynamic map data corresponding to the circuit 100 which is created is extracted from the dynamic map storage 66, and is transmitted to the vehicle C. The operation schedule creator 62 creates a normal operation schedule to be described later.

Data of the self position (self vehicle position) and time are transmitted from the operating vehicle C to the introduction necessity judgment unit 60 at a predetermined time interval or in response to a request from the introduction necessity judgment unit 60. In addition, operation schedule data provided to each of the operating vehicles C which are currently traveling in laps is transmitted from the operation schedule changer 61 and the operation schedule creator 62 to the introduction necessity judgment unit 60. Based on these data, the introduction necessity judgment unit 60 determines a boarding demand for each operating vehicle C.

Further, as will be described below, the introduction necessity judgment unit 60 uses a wait time Dw (refer to FIG. 4) as a boarding demand parameter, to determine the boarding demand for each operating vehicle C. Moreover, the introduction necessity judgment unit 60 judges a necessity of introduction of an additional vehicle C based on the boarding demand. When it is judged that the introduction of the additional vehicle C is necessary, an introduction request command is output from the introduction necessity judgment unit 60 to the introduction timing determiner 69. The introduction timing determiner 69 determines an introduction timing of the additional vehicle to the circuit 100 when the introduction timing determiner 69 receives the introduction request command from the introduction necessity judgment unit 60.

In association with the introduction of the additional vehicle, the operation schedule changer 61 changes the operation schedule provided to each of the operating vehicles C which are already autonomously traveling on the circuit 100, from the normal operation schedule. As will be described later, when the operation schedule is to be changed after the additional vehicle is introduced to the circuit 100, a post-introduction change process is executed. When the operation schedule is to be changed before the additional vehicle is introduced to the circuit 100, a pre-introduction change process is executed.

The operation schedule provider 63 provides the normal operation schedule created by the operation schedule creator 62 to each of the operating vehicles C at the operation schedule updating point Pu. In addition, when the operation schedule has been changed by the operation schedule changer 61 from the normal operation schedule, the operation schedule provider 63 temporarily stops provision of the normal operation schedule, and provides the changed operation schedule to each of the operating vehicles C at the operation schedule updating point Pu.

<Normal Operation Schedule>

The normal operation schedule is an operation schedule which is applied when the operating vehicles (vehicles C1~C4 in FIG. 1) which autonomously travel on the circuit 100 travel in a circle while the number of the operating vehicles is maintained. In other words, the normal operation schedule is applied when the vehicles C travel one lap of the circuit 100 in a state without an increase or a decrease in the number of vehicles.

For example, in the normal operation schedule, a stopping time (planned stopping time to be described later) at each of the stops ST1~ST3 is uniformly set for the vehicles C, and a target velocity V1 is also uniformly set for the vehicles C, so that operation intervals of the operating vehicles C traveling on the circuit 100 are an equal interval to each other.

The target velocity V1 and the planned stopping time at each of the stops ST1~ST3 which are set in the normal operation schedule are also herein referred to as □normal value(s)□ From this viewpoint, the normal operation schedule may also be considered to be an operation schedule formed using the normal value(s). The normal operation schedule is determined by the operation schedule creator 62 of the operation management apparatus 10 in advance, for example, before the operation is actually executed with the operation schedule.

Figure 4:
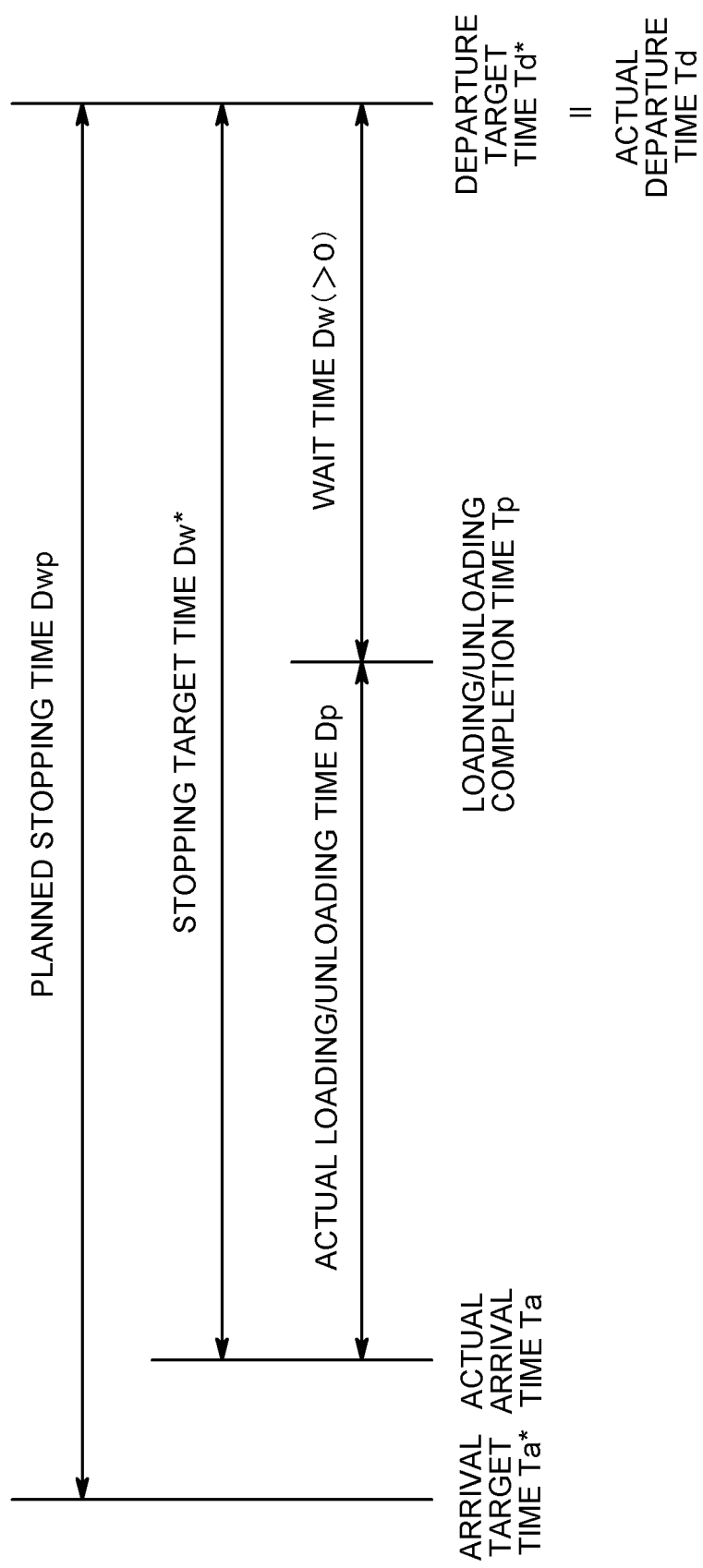
FIG. 4 is an explanatory diagram (1/3) of terms used in an operation schedule creation.
Figure 5:
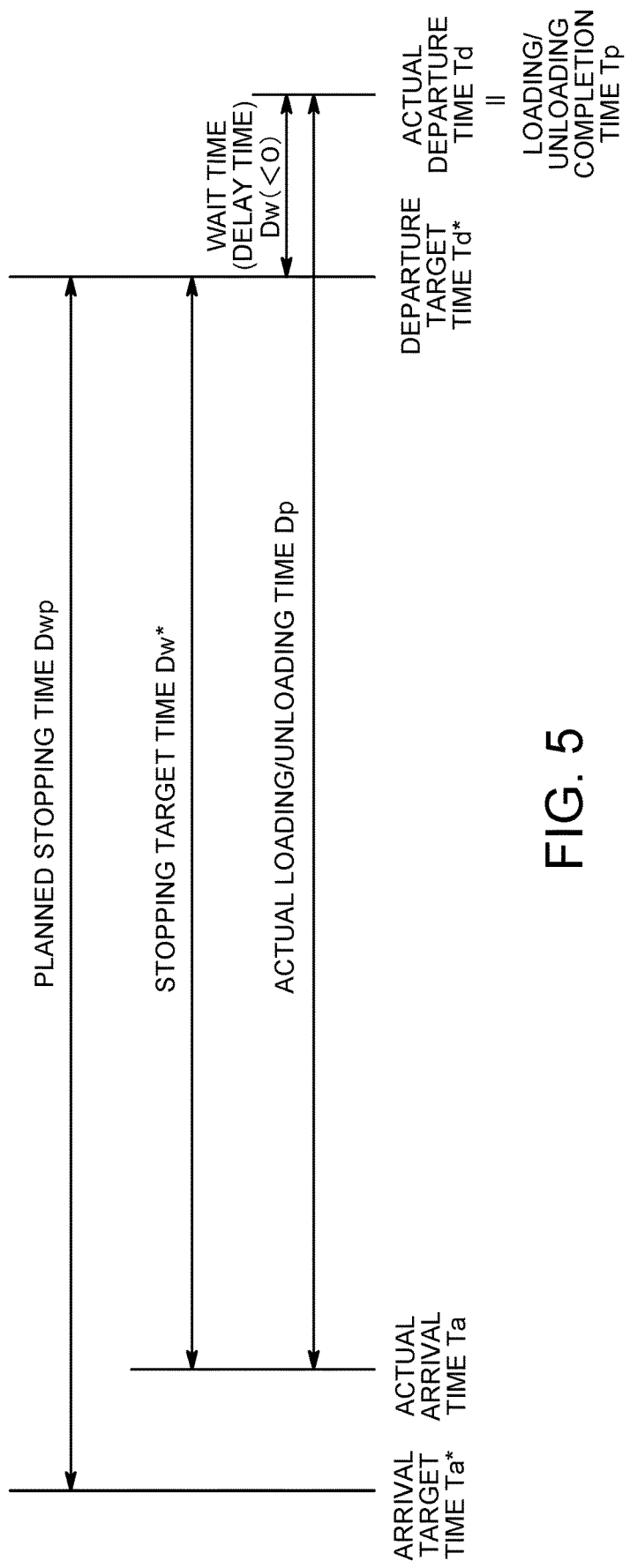
FIG. 5 is an explanatory diagram (2/3) of terms used in an operation schedule creation.
Figure 6:
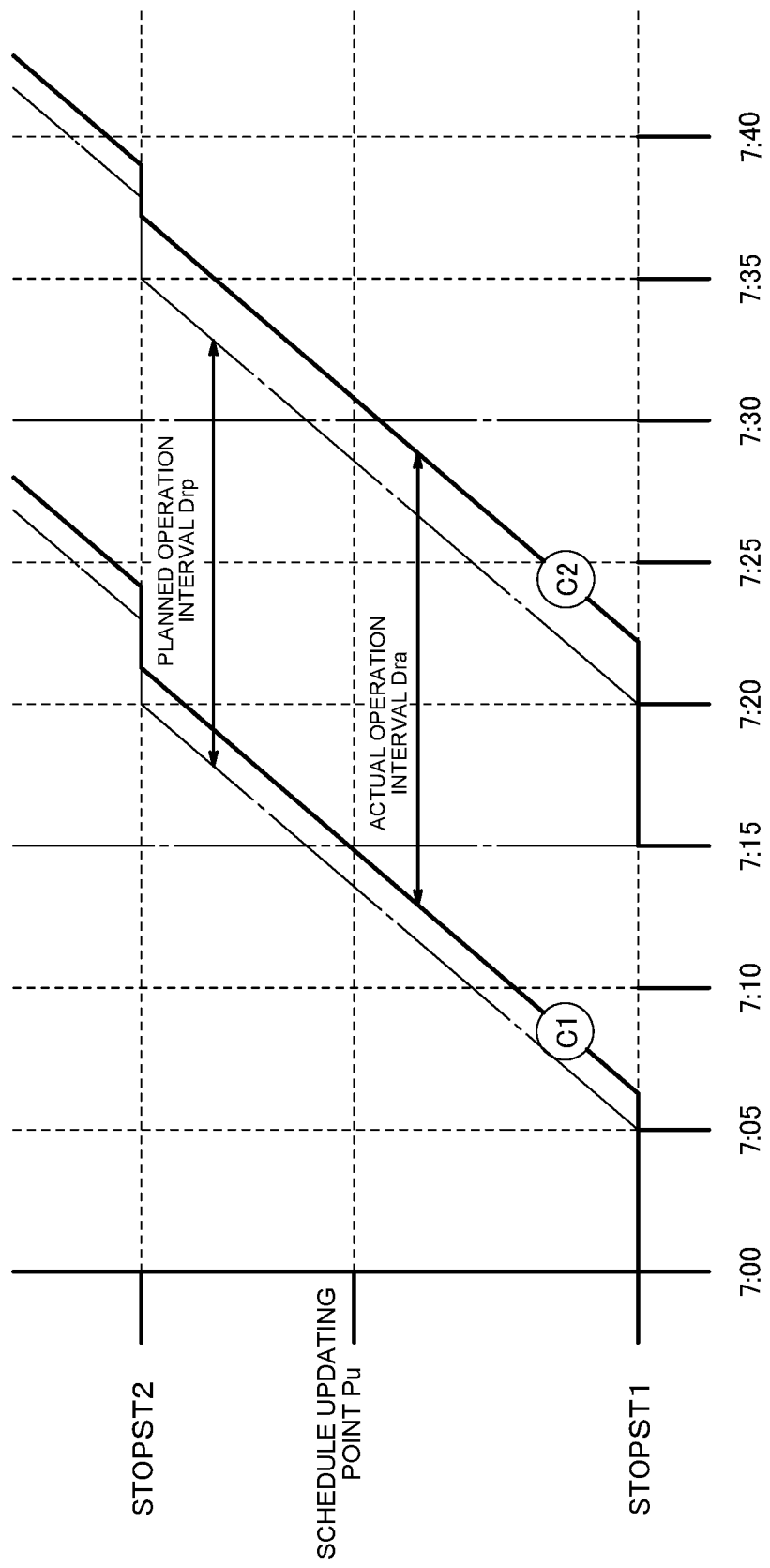
FIG. 6 is an explanatory diagram (3/3) of terms used in an operation schedule creation.

Terms which are used in the operation schedule and in the schedule change are shown in FIGS. 4 to 6. As shown in FIG. 4, in the normal operation schedule, an arrival target time Ta* at each stop ST and a departure target time Td* at which the vehicle departs from the stop are determined for each vehicle C. A period from the arrival target time Ta* till the departure target time Td* is a stopping time of the vehicle C on the schedule, and is called a planned stopping time Dwp.

In addition, in an actual operation, due to a delay at a previous stop, congestion on the circuit 100, or the like, the vehicle C may arrive at the stop ST at a time different from the arrival target time Ta*. This actual arrival time is called an actual arrival time Ta. In addition, a period from the actual arrival time Ta till the departure target time Td* is a target time for allowing the vehicle C to depart from the stop ST according to the schedule, and is called a stopping target time Dw*.

Further, an actual loading/unloading time to and from the vehicle C is called an actual loading/unloading time Dp. The actual loading/unloading time Dp is a period from the actual arrival time Ta till a loading/unloading completion time Tp. In addition, a time obtained by subtracting the actual loading/unloading time Dp from the stopping target time Dw* is called a wait time Dw.

FIG. 4 shows a case in which the wait time Dw has a positive value. In this case, the wait time Dw is a time from the loading/unloading completion time Tp to the departure target time Td*, and thus is a time in which the vehicle C waits for the departure, after the loading/unloading to and from the vehicle C is completed. After the wait time Dw has elapsed, and the departure target time Td* is reached, the vehicle C departs from the stop. In other words, when the wait time Dw has a positive value, an actual departure time Td which is a time at which the vehicle C actually departs from the stop ST is basically equal to the departure target time Td*.

As will be described later, the wait time Dw corresponds to a time in which the departure target time Td* can be brought forward (advanced) to change the operation schedule, that is, a marginal time.

FIG. 5 shows a case in which the actual loading/unloading time Dp is greater than the stopping target time Dw*, and the wait time Dw has a negative value. In this case, loading and unloading of the passengers continues even after the departure target time Td*, and upon completion of the loading/unloading, the vehicle C departs immediately. Thus, the loading/unloading completion time Tp and the actual departure time Td become basically equal to each other. In this case, there is no margin for advancing the departure target time Td*.

FIG. 6 shows an operation interval between operating vehicles C1 and C2. The operation interval refers to an interval of driving times of consecutive operating vehicles C1 and C2. In the diagram for the operating vehicles C1 and C2, a dot-and-chain line shows a normal operation diagram, and a solid line shows an actual operation diagram for the operating vehicles C1 and C2. In the following, in the diagram, a horizontal axis shows a time and a vertical axis shows a route on the circuit.

FIG. 6 shows, as operation intervals, a planned operation interval Drp and an actual operation interval Dra. The planned operation interval Drp is an operation interval of the operating vehicles C1 and C2 based on the normal operation diagram. The actual operation interval Dra is an operation interval of the operating vehicles C1 and C2 based on the actual operation diagram. The actual operation interval Dra can be determined, for example, from the data of the self position (self vehicle position) and the time transmitted from the operating vehicle C. For example, a time difference between a time when the operating vehicle C1 passes a predetermined point on the circuit 100 and a time when the following operating vehicle C2 passes the same point is the actual operation interval Dra of the operating vehicles C1 and C2.

Figure 7:
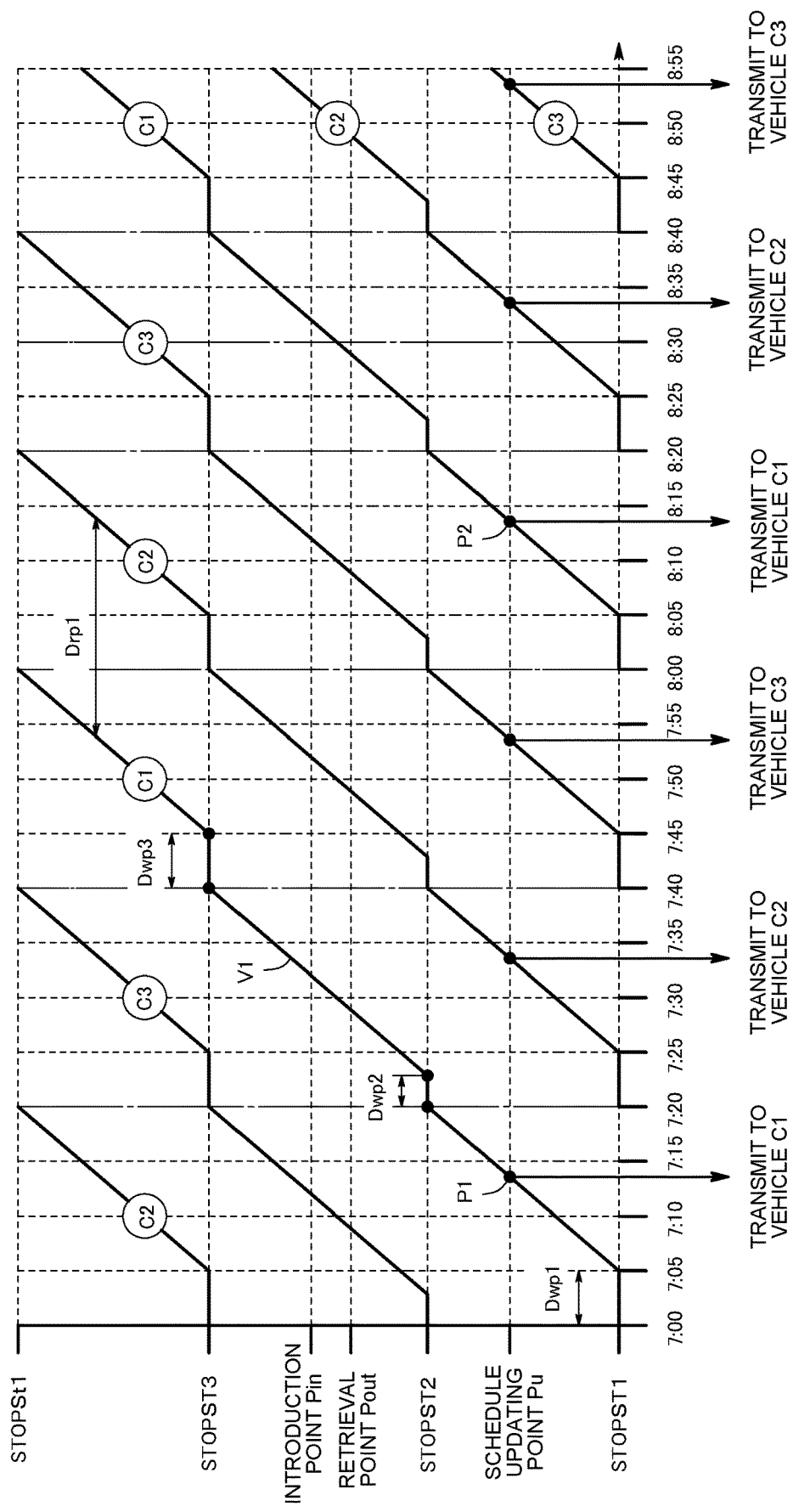
FIG. 7 shows a diagram exemplifying a normal operation schedule, operated with a number of vehicles being 3 and an interval of 20 minutes.
Figure 8:
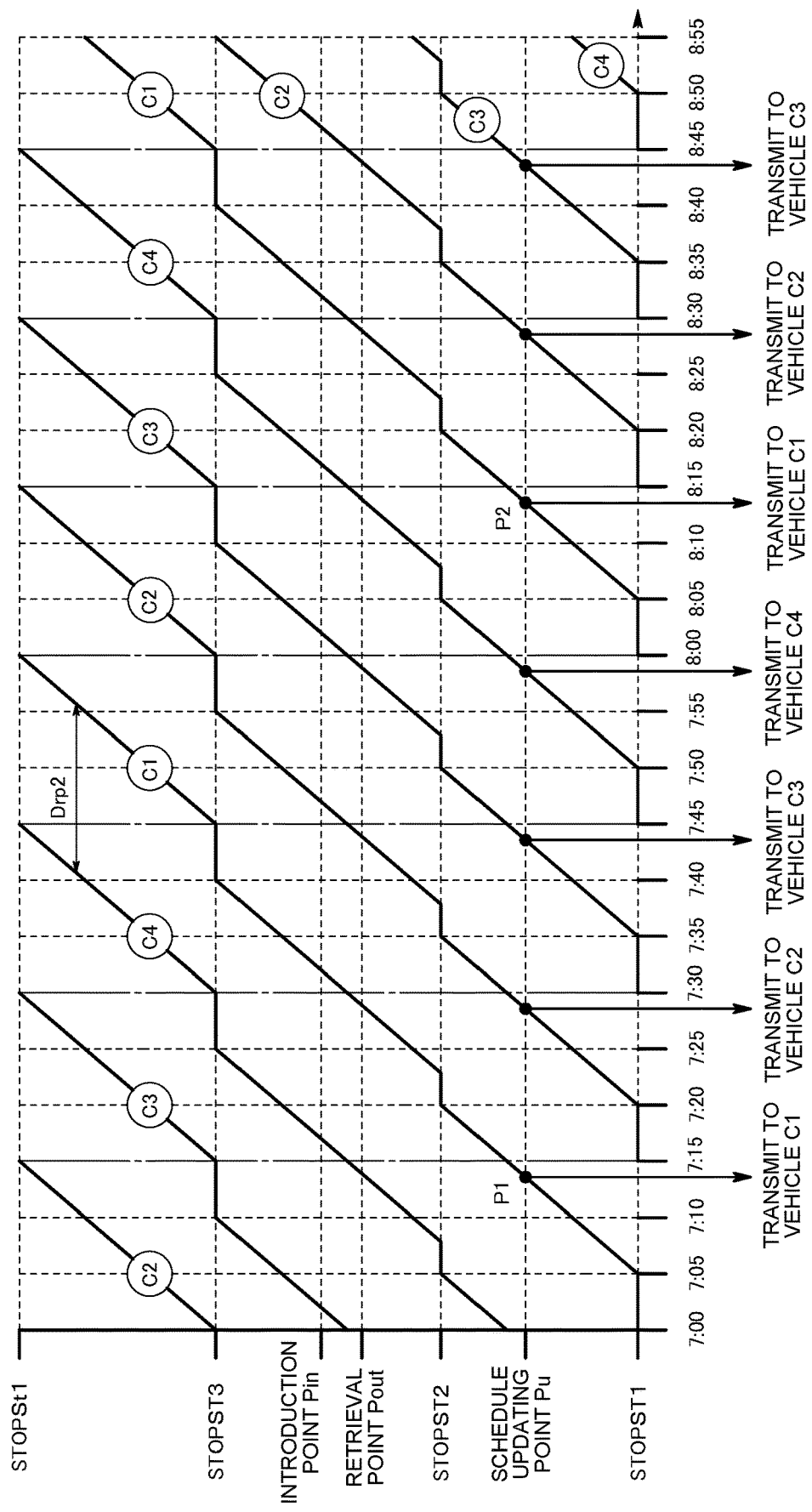
FIG. 8 shows a diagram exemplifying a normal operation schedule, operated with a number of vehicles being 4 and an interval of 15 minutes.
Figure 9:
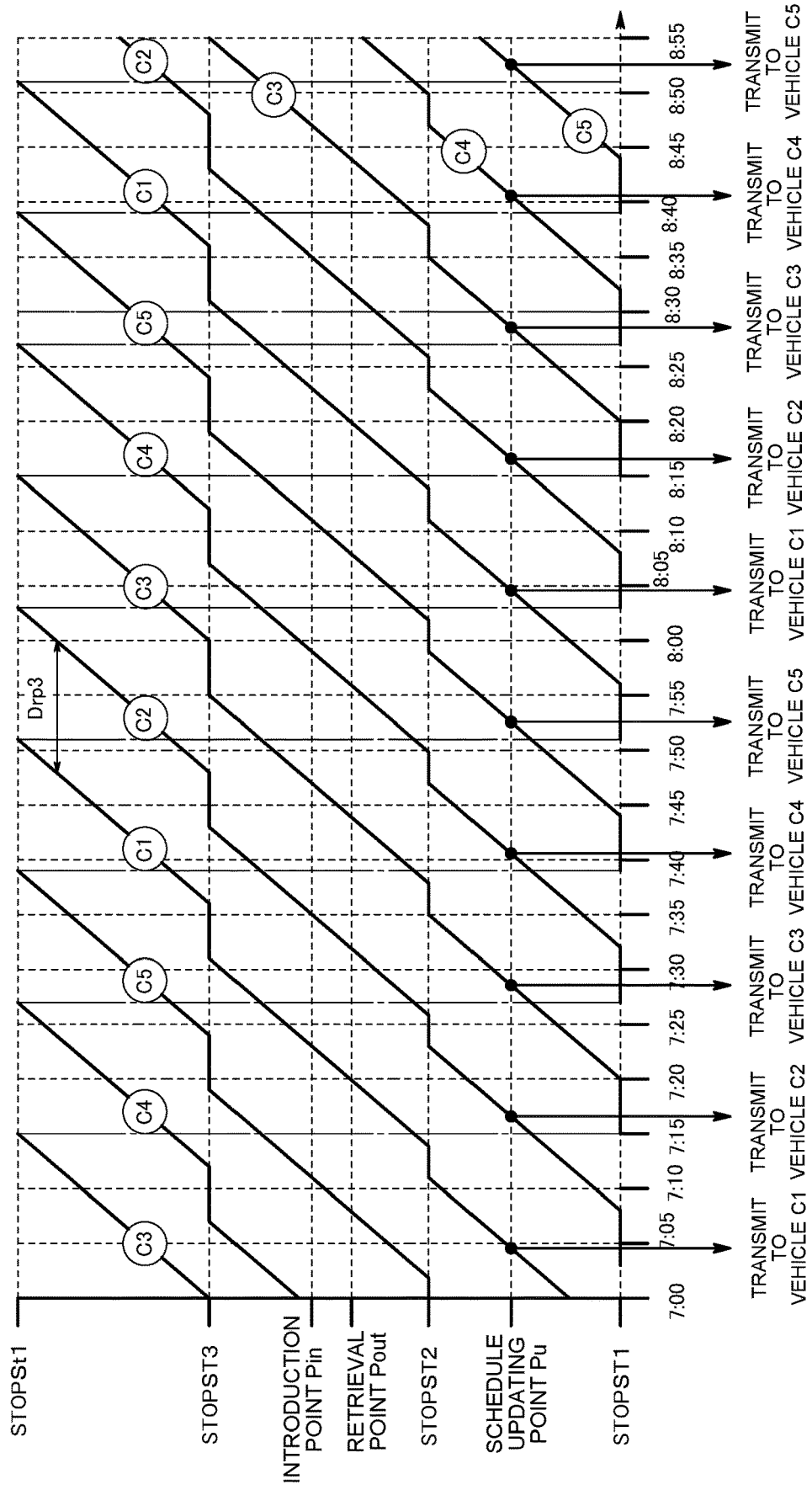
FIG. 9 shows a diagram exemplifying a normal operation schedule, operated with a number of vehicles being 5 and an interval of 12 minutes.

FIGS. 7 to 9 show diagrams according to normal operation schedules having different operation configurations. FIG. 7 shows a normal operation diagram of an operation with a number of vehicles of 3 and an interval of 20 minutes. A horizontal axis shows time, and a vertical axis shows various locations on the circuit 100, including stops ST1~ST3, the operation schedule updating point Pu, the retrieval point Pout, and the introduction point Pin.

In this example configuration, a target velocity V1 which is a normal value is uniformly set for all of the operating vehicles C1~C3. In addition, the planned stopping times Dwp at the stops ST1, ST2, and ST3 are uniformly set to planned stopping times Dwp1, Dwp2, and Dwp3 which are normal values. Further, a planned operation interval Drp1 is set to 20 minutes.

FIG. 8 shows a normal operation diagram of an operation with a number of vehicles of 4 and an interval of 15 minutes. In this example configuration also, the target velocity V1 which is the normal value is uniformly set for all of the operating vehicles C1~C4. In addition, the planned stopping times Dwp at the stops ST1, ST2, and ST3 are uniformly set to the planned stopping times Dwp1, Dwp2, and Dwp3 which are the normal values. Further, the planned operation interval Drp2 is set to 15 minutes.

FIG. 9 shows a normal operation diagram of an operation with 5 vehicles and an interval of 12 minutes. In this example configuration also, the target velocity V1 which is the normal value is uniformly set for all of the operating vehicles C1~C5. In addition, the planned stopping times Dwp at the stops ST1, ST2, and ST3 are uniformly set to the planned stopping times Dwp1, Dwp2, and Dwp3 which are the normal values. Further, the planned operation interval Drp3 is set to 12 minutes.

For example, when the operation configuration on the circuit 100 is the configuration as shown in FIG. 8 with the number of vehicles being 4 and the interval being 15 minutes, at the operation schedule updating point Pu the operation schedule provider 63 (FIG. 3) provides the operation schedule to each of the operating vehicles C1~C4 passing the updating point. In this case, the operation schedule provider 63 provides one lap of the operation schedule to each of the operating vehicles C1~C4 passing the operation schedule updating point Pu.

For example, when the operating vehicle C1 passes the operation schedule updating point Pu, the operation schedule data for the operating vehicle C1 is provided to the operating vehicle C1 from the point Pu, the operation schedule data including data until the operating vehicle C1 next passes the operation schedule updating point Pu, for example, from a point P1 to a point P2 in FIG. 8.

The operation schedule data provided to an operating vehicle Ck (in the configuration with 4 vehicles, k=1~4) in this process includes arrival target times at the stops ST1~ST3, Ta*_Ck_ST1~Ta*_Ck_ST3, departure target times from the stops ST1~ST3, Td*_Ck_ST1~Td*_Ck_ST3, and the target velocity V1.

<Introduction Necessity Judgment Process>

Figure 10:
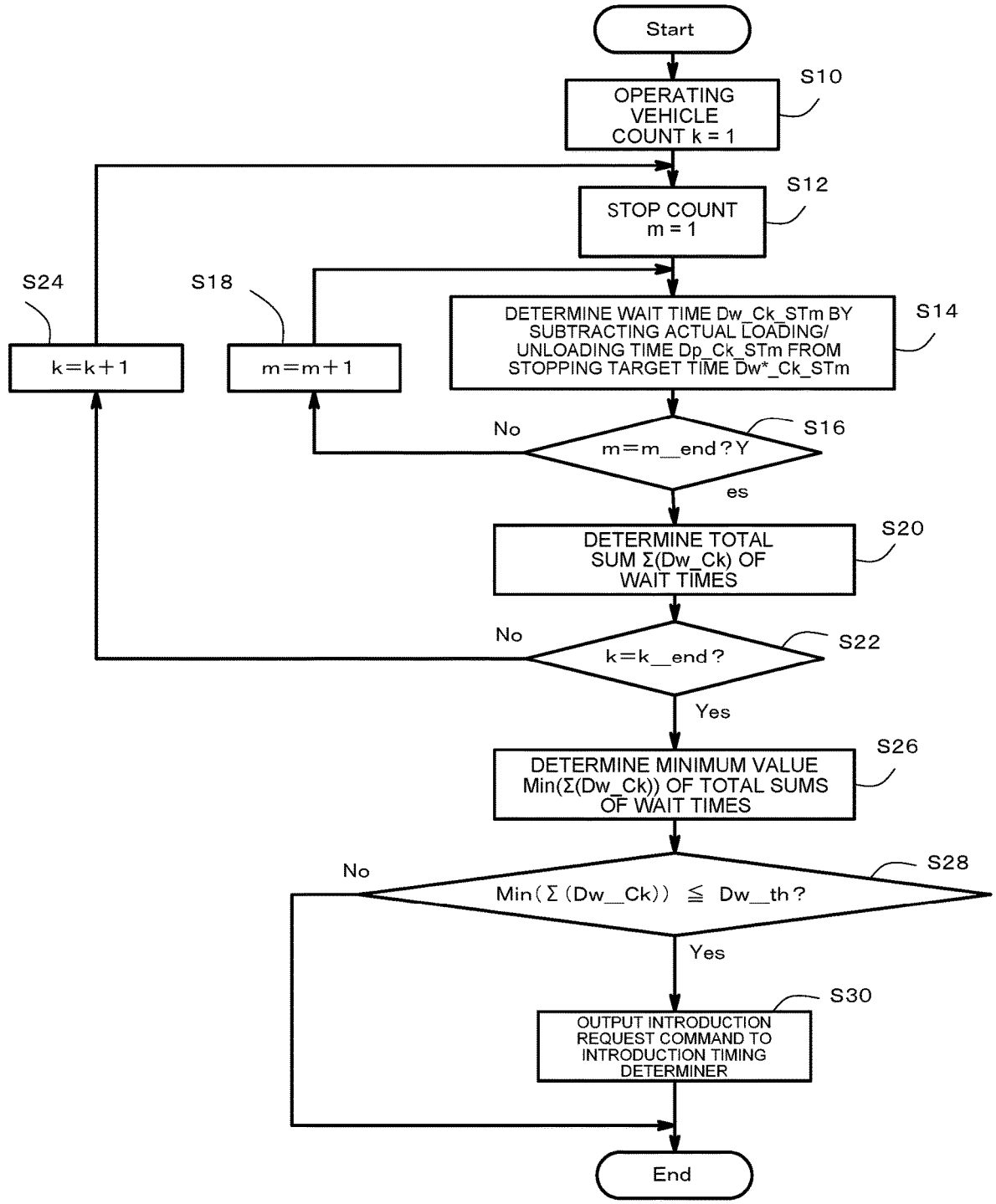
FIG. 10 is a flowchart exemplifying introduction necessity judgment.

FIG. 10 shows a flow of an introduction necessity judgment process, executed by the introduction necessity judgment unit 60. As will be described below, this flow is repeatedly executed at a predetermined time interval by the introduction necessity judgment unit 60. For example, the flow is executed every time the operating vehicle C passes the schedule updating point Pu. During execution of the flow of introduction-time operation control shown in FIG. 11, the introduction necessity judgment flow may be stopped (interrupted).

In the introduction necessity judgment flow, as a parameter for judging the boarding demand (boarding demand parameter), the wait time Dw (refer to FIGS. 4 and 5) is used. As will be described later in detail, the introduction necessity judgment unit 60 (FIG. 3) judges the necessity of introduction of the additional vehicle based on the wait time Dw.

As the wait time Dw becomes larger (large on the positive side), the time required for loading and unloading is shorter, that is, the number of passengers is smaller, meaning a lower boarding demand. On the contrary, when the wait time Dw reaches 0 or becomes negative, the time required for loading and unloading is long, and the number of passengers is large, meaning a higher boarding demand.

As a threshold for judging the highness/lowness of the boarding demand, a positive threshold Dw_th (>0) is used. For example, the threshold Dw_th is determined based on a total sum (Dwp1+Dwp2+Dwp3) of the planned stopping times Dwp at the stops ST1~ST3. For example, a value of 15% of the total sum (Dwp1+Dwp2+Dwp3) of the planned stopping times Dwp is set as the threshold Dw_th.

In the following, the introduction necessity judgment flow will be explained with reference to an operation configuration with 3 vehicles and an interval of 20 minutes (refer to FIG. 7). With reference to FIG. 10, the introduction necessity judgement unit 60 (FIG. 3) sets an operating vehicle count k to an initial value of 1 (S10). That is, a target for which the wait time is to be determined is set to the operating vehicle C1. Next, the introduction necessity judgment unit 60 sets a stop count m to an initial value (S12). That is, the target for which the wait time is to be determined is set to the time when the operating vehicle C1 stops at the stop ST1.

The introduction necessity judgment unit 60 acquires, from the operating vehicle C1, the actual arrival time Ta_C1_ST1 at the stop ST1, the loading/unloading completion time Tp_C1_ST1, and the departure target time Td*_C1_ST1 from the stop ST1. Further, the introduction necessity judgment unit 60 determines the stopping target time Dw*_C1_ST1 from the actual arrival time Ta_C1_ST1 and the departure target time Td*_C1_ST1.

In addition, the introduction necessity judgment unit 60 determines the actual loading/unloading time Dp_C1_ST1 from the actual arrival time Ta_C1_ST1 and the loading/unloading completion time Tp_C1_ST1. Moreover, the introduction necessity judgment unit 60 subtracts the actual loading/unloading time Dp_C1_ST1 from the stopping target time Dw*_C1_ST1, to determine the wait time Dw_C1_ST1 (S14).

The introduction necessity judgment unit 60 then judges whether or not the stop count m has reached a final value m_end (S16). When the stop count m has not reached the final value m_end, the introduction necessity judgment unit 60 increments the stop count m (S18), returns to step S14, and determines the wait time for the next stop.

When it is judged that the stop count m has reached the final value m_end, the introduction necessity judgement unit 60 determines a lap wait time $\Sigma(Dw\_Ck)$, which is a total sum of the wait times of one lap of the circuit 100, that is, wait times of all stops ST1~ST3, for the operating vehicle Ck (S20). Next, the introduction necessity judgment unit 60 judges whether or not the operating vehicle count k has reached a final value k_end (S22) (in the example configuration, the operating vehicle C3 corresponds to this final value). When the final value k_end has not been reached, the operating vehicle count k is incremented (S24), and the process returns to step S12.

When it is judged in step S22 that the operating vehicle count k has reached the final value k_end, the introduction necessity judgment unit 60 judges whether or not a representative value of the lap wait times $\Sigma(Dw\_Ck)$ of the operating vehicles C1~C3 is less than or equal to the threshold Dw_th.

For example, as the representative value, a minimum value of the lap wait times, $Min(\Sigma(Dw\_Ck))$, that is, a time having the smallest margin among the lap wait time, is selected. The introduction necessity judgment unit 60 determines the minimum value $Min(\Sigma(Dw\_Ck))$ among the lap wait times (Dw_Ck) of the operating vehicles C1~C3 (S26). Alternatively, in place of setting the minimum value as the representative value, an average value may be taken as the representative value.

The introduction necessity judgment unit 60 judges whether or not the minimum value $Min(\Sigma(Dw\_Ck))$ is less than or equal to the threshold Dw_th (S28). When the minimum value $Min(\Sigma(Dw\_Ck))$ is greater than the threshold Dw_th, it is judged that there is a sufficient wait time, and that the boarding demand is low, and introduction of the additional vehicle is put off.

On the other hand, when the minimum value $Min(\Sigma(Dw\_Ck))$ is less than or equal to the threshold Dw_th, the introduction necessity judgment unit 60 judges that introduction of the additional vehicle is necessary, and outputs (transmits) an introduction request command to the introduction timing determiner 69 (S30).

<Introduction-Time Operation Control>

Figure 11:
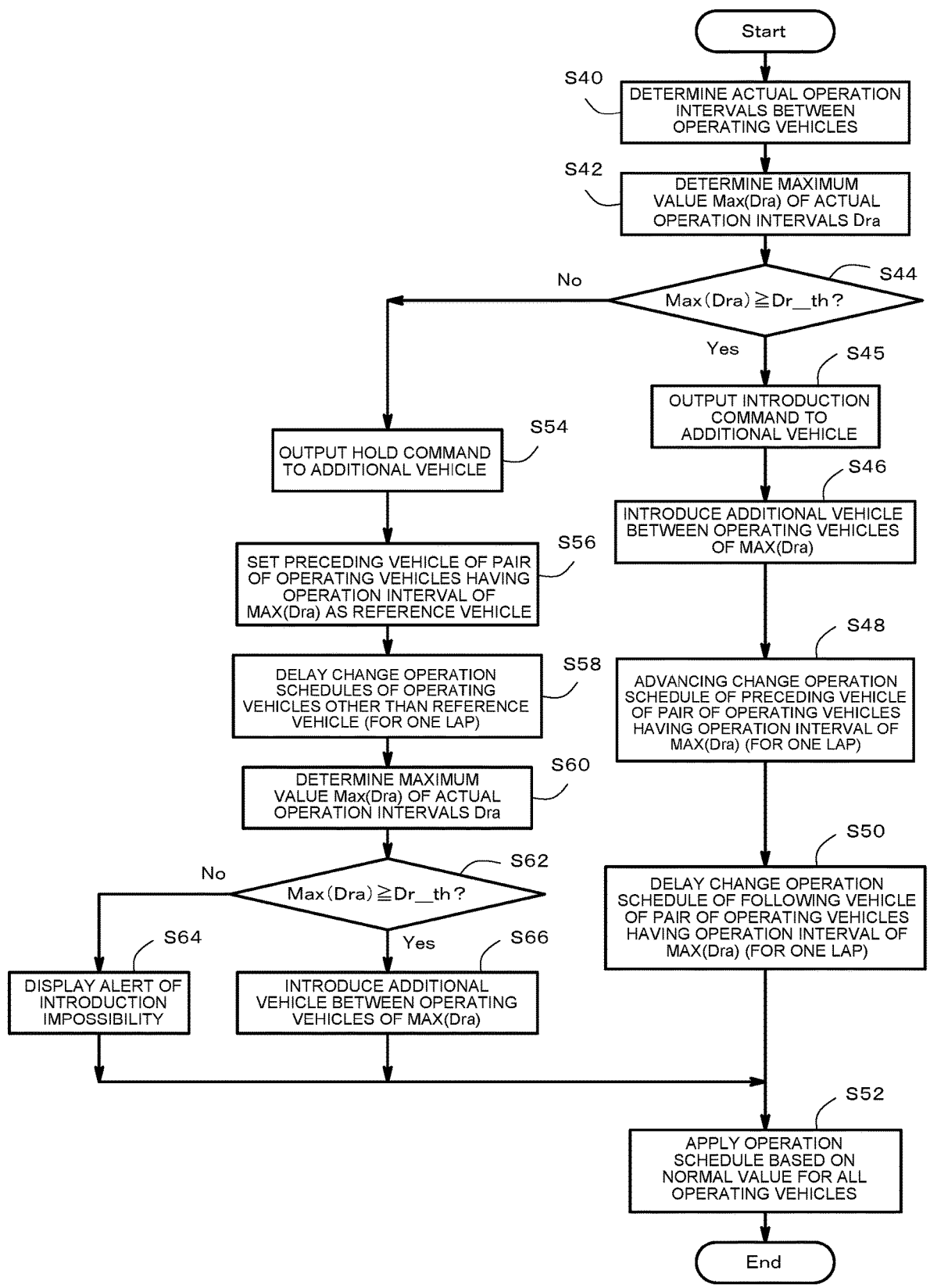
FIG. 11 is a flowchart exemplifying introduction-time operation control.

FIG. 11 exemplifies a flowchart of operation control at the time of introduction of the additional vehicle. This flow is executed by the introduction timing determiner 69, the operation schedule changer 61, the operation schedule creator 62, and the operation schedule provider 63. In addition, this flow is started when the introduction timing determiner 69 receives the introduction request command from the introduction necessity judgment unit 60.

The introduction timing determiner acquires the self position (self vehicle position) and time from each operating vehicle C, and determines the actual operation intervals Dra between the operating vehicles C based on the acquired data (S40).

Next, the introduction timing determiner 69 determines a maximum value, Max(Dra), of the actual operation intervals Dra between the operating vehicles C (S42). Then, the introduction timing determiner 69 judges whether or not the maximum value Max(Dra) of the actual operation intervals Dra is greater than or equal to an interval threshold Dr_th (S44).

In this step, it is judged whether or not the maximum value Max(Dra) of the actual operation intervals Dra is sufficiently long to enable safe introduction of the additional vehicle. The interval threshold Dr_th is determined, for example, according to the target velocity V1 provided to the operating vehicle C. Qualitatively, as the target velocity V1 becomes higher (as the vehicle becomes faster), the interval threshold Dr_th is set to a higher value (longer time). For example, the interval threshold Dr_th is determined in direct proportion to the target velocity V1.

When the maximum value Max(Dra) of the actual operation intervals Dra is greater than or equal to the interval threshold Dr_th, it is judged that there is a sufficient inter-vehicle space for introduction of the additional vehicle. In this case, a process is executed in which the additional vehicle is introduced to the circuit 100, and then, the operation intervals of all operating vehicles, including the additional vehicle, are set to an equal interval. This process is called a post-introduction change process (S45~S50).

On the other hand, when the maximum value Max(Dra) of the actual operation intervals Dra is less than the interval threshold Dr_th, it is judged that there is insufficient inter-vehicle space for the introduction of the additional vehicle. In this case, first, the operation schedules of the operating vehicles C are changed, to enlarge the inter-vehicle space for the additional vehicle, and then, the additional vehicle is introduced. This process is called a pre-introduction change process (S54~S66).

<Post-Introduction Change Process>

When it is judged in step S44 that the maximum value Max(Dra) of the actual operation intervals Dra is greater than or equal to the interval threshold Dr_th, an introduction command is output from the introduction timing determiner 69 to an additional vehicle C4 (S45). In parallel to this process, a normal operation schedule from the introduction point Pin to the operation schedule updating point Pu is provided from the operation schedule provider 63 to the additional vehicle C4.

Figure 12:
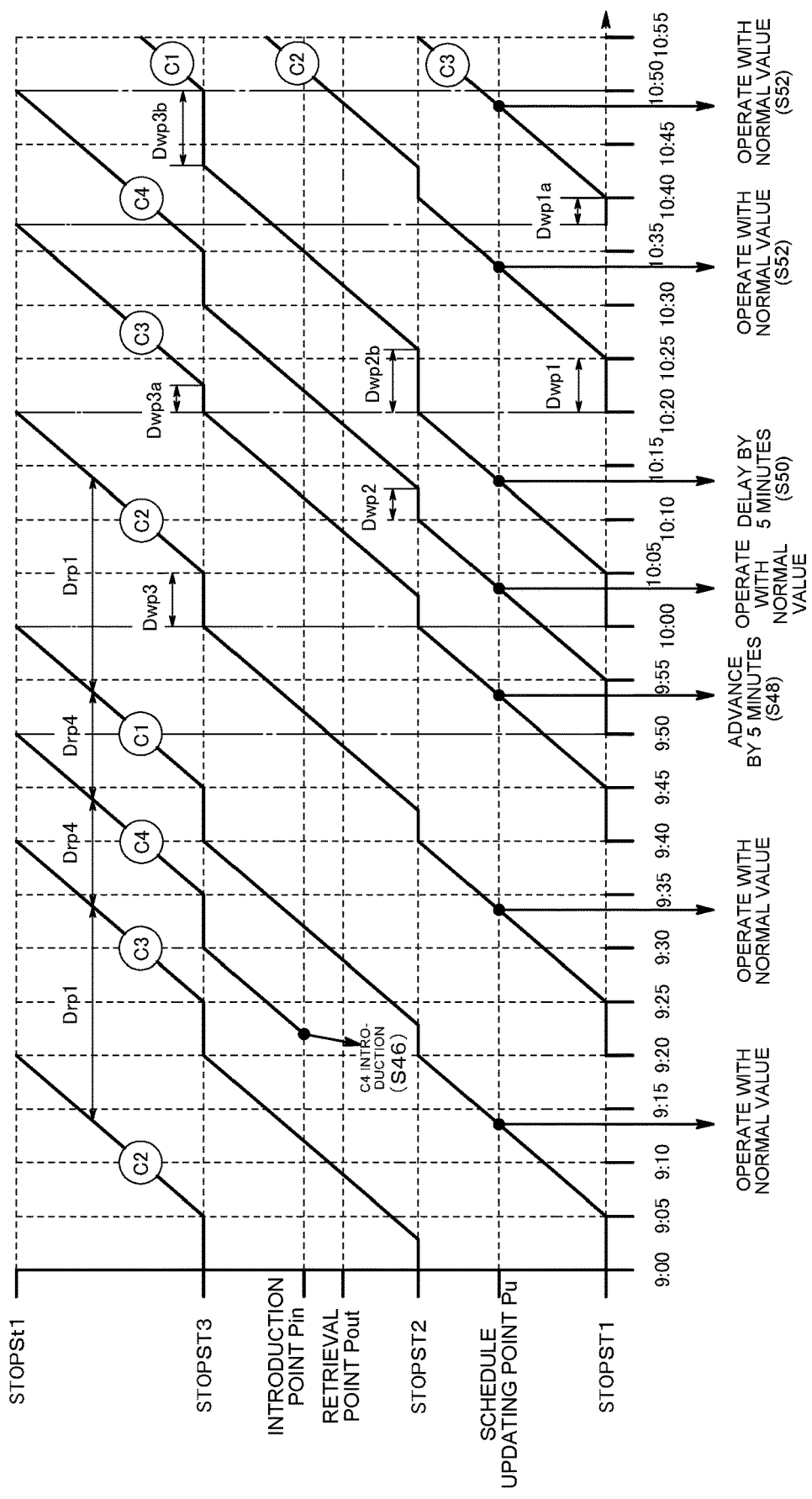
FIG. 12 shows a diagram exemplifying a post-introduction change process.

In this process, the introduction timing from the introduction point Pin to the circuit 100 is determined to be between the operating vehicles having the maximum value Max(Dra) as the actual operation interval Dra (S46). For example, FIG. 12 is a diagram of when the post-introduction change process is in progress. In this example configuration, during the operation of the configuration with 3 vehicles and a 20 minute interval, the additional vehicle C4 is introduced, and then, the operation intervals are made even. As operating vehicles having the maximum value Max(Dra) as the actual operation interval Dra, the operating vehicles C3 and C1 are selected.

For example, the introduction time of the additional vehicle C4 is determined in a period from a time when the operating vehicle C3 which is the preceding vehicle, of the operating vehicles C3 and C1, passes the introduction point Pin to a time when the following operating vehicle C1 passes the introduction point Pin. For example, the introduction time of the additional vehicle C4 is determined at a time which is a middle point of the times when the operating vehicles C3 and C1 pass the introduction point Pin (around 9:22). Then, the additional vehicle C4 is operated based on the normal operation schedule.

In this case, with the introduction of the additional vehicle C4, an operation interval Dr4 between the additional vehicle C4 and the operating vehicles C3 and C1 in front of and behind the additional vehicle C4 becomes half of the operation interval Dr1 of the operating vehicles C2 and C3 and the operating vehicles C1 and C2. In order to correct such uneven operation intervals, the operation schedule is changed.

The operation schedule changer 61 changes the operation schedules, after the introduction of the additional vehicle C4, of the operating vehicle C3 which is one vehicle preceding the additional vehicle C4 added to the circuit 100 based on the introduction command and of the operating vehicle C1 which is one vehicle behind the additional vehicle C4. Specifically, the operation schedule changer 61 advances the departure target times Td* at the stops ST1~ST3 for the operating vehicle C3 which is the preceding vehicle, from the departure target times Td* determined based on the normal operation schedule (S48). In addition, the operation schedule changer 61 delays the departure target times Td* at the stops ST1~ST3 for the operating vehicle C1 which is the following vehicle, from the departure target times Td* determined based on the normal operation schedule (S50).

For the other operating vehicles C2 and C4, an operation schedule based on the normal value, that is, the normal operation schedule, is provided. Alternatively, an advancement or a delay of a slight time may be applied to this schedule.

An advancement magnitude (or an extent of advancement) of the departure target time Td* for the advancement and a push-back magnitude (or an extent of push-back) of the departure target time Td* for the delay are determined according to the planned operation intervals Drp1 and Drp4. For example, when Drp1 is 20 minutes and Drp4 is 10 minutes, the advancement magnitude and the push-back magnitude are 5 minutes per lap. With such an advancement and a push-back, the operation schedule becomes the configuration as exemplified in FIG. 8; that is, an equal-interval operation with 4 vehicles and 15 minutes interval.

Figure 13:
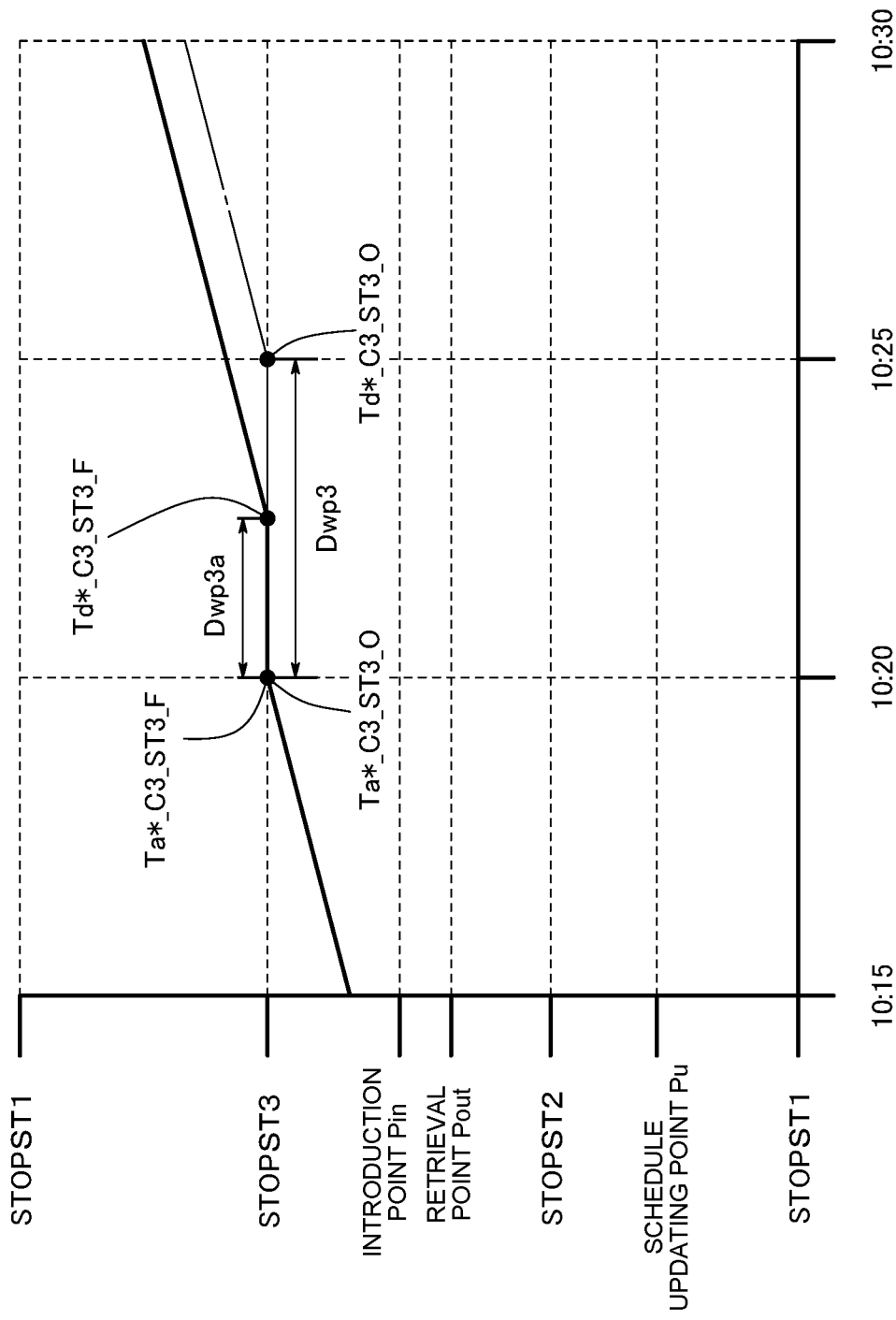
FIG. 13 is a diagram for explaining an advancement process of a departure target time.

FIG. 13 shows an example of an advancement process (front-load process) for the operating vehicle C3 near the stop ST3. With regard to the departure target time Td* of the operating vehicle C3 from the stop ST3, the departure target time Td*_C3_ST3_F after the schedule change is advanced from the departure target time Td*_C3_ST3_O based on the normal operation schedule. With this process, the planned stopping time Dwp3a after the schedule change becomes shorter than the planned stopping time Dwp3 based on the normal operation schedule.

Figure 14:
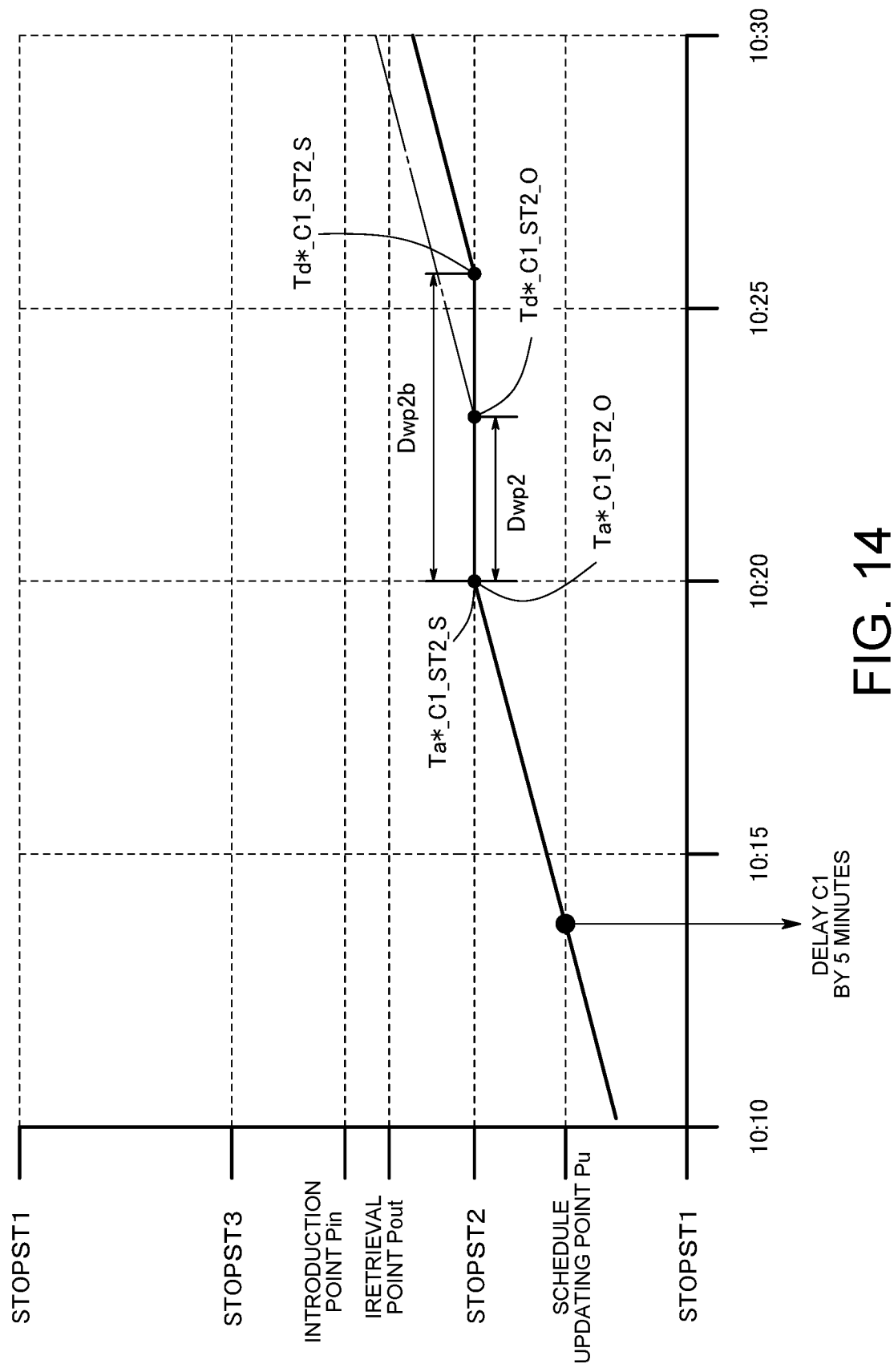
FIG. 14 is a diagram for explaining a push-back process of a departure target time.

FIG. 14 shows an example of a push-back process (delay process) of the operating vehicle C1 near the stop ST2. With regard to the departure target time Td* of the operating vehicle C1 from the stop ST2, the departure target time Td*_C1_ST2_S after the schedule change is delayed from the departure target time Td*_C1_ST2_O based on the normal operation schedule. With this process, the planned stopping time Dwp2b after the schedule change becomes longer than the planned stopping time Dwp2 based on the normal operation schedule.

As described above, the advancement magnitude and the push-back magnitude are values per lap of the circuit 100. Thus, the advancement magnitude (the extent of advancement) and the push-back magnitude (the extent of push-back) may be distributed among the stops. For example, for the operating vehicle C3, when the advancement magnitude is determined to be 5 minutes, the planned stopping times Dwp at the stops ST1~ST3 are each shortened by 5/3 minutes (=100 seconds).

Figure 15:
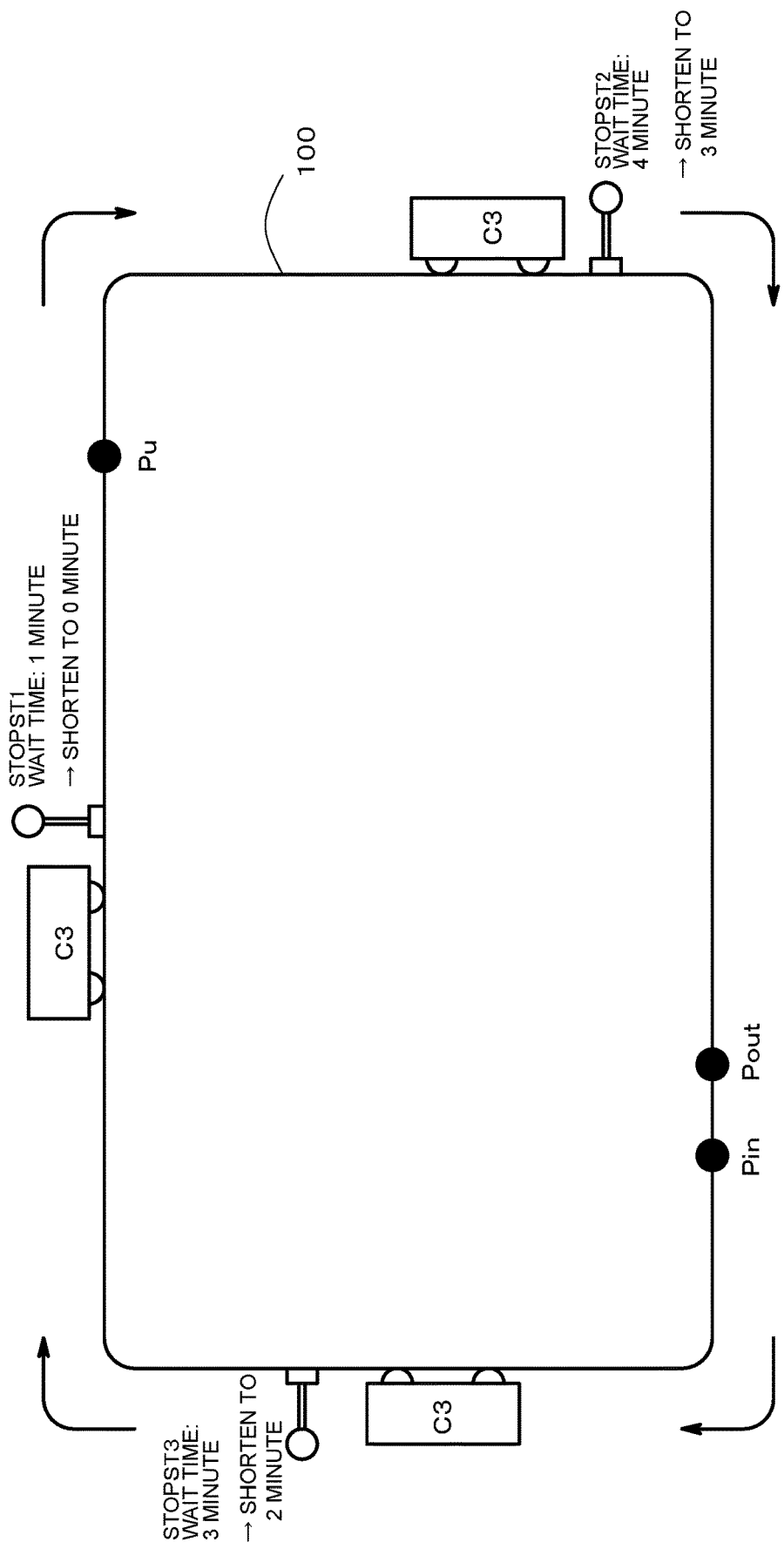
FIG. 15 is a diagram for explaining an example setting of an advancement magnitude for each stop.

Alternatively, as exemplified in FIG. 15, the advancement magnitudes at the stops ST1~ST3 may be determined according to a track record value of the wait time Dw for each of the stops ST1~ST3 in a past lap. For example, FIG. 15 exemplifies a wait time Dw at each of the stops ST1~ST3 at a previous lap of the operating vehicle C3.

As described above, the wait time Dw shows a temporal margin in which the actual loading/unloading time Dp is subtracted from the stopping target time Dw* (refer to FIG. 4), and shows a time for which the advancement is possible. By increasing the advancement magnitude for a larger wait time Dw, an operation schedule which is realistic (which can be realized) can be created.

For example, the advancement magnitude for the operating vehicle C3 is 5 minutes per lap. Of the stops ST1~ST3, the advancement magnitude for the stop ST2 having the longest wait time Dw (4 minutes) is set at 3 minutes. The advancement magnitude for the stop ST3 having the next longest wait time Dw after the stop ST2 (3 minutes) is set at 2 minutes. Similarly, the advancement magnitude for the stop ST1 having the shortest wait time Dw (1 minute) is set at 0 minute (no advancement).

With application of one lap of the operation schedules with the advancement process and the push-back process to the operating vehicles C3 and C1, the diagram of unequal interval as shown in FIG. 12 can be corrected to the diagram of equal interval as shown in FIG. 8. When the operating vehicles C3 and C1 again reach the operation schedule updating point Pu with the changed operation schedules, an operation schedule based on the normal value, that is, the normal operation schedule, is provided to all of the operating vehicles C1~C4, including the operating vehicles C3 and C1 (S52).

<Pre-Introduction Change Process>

Figure 16:
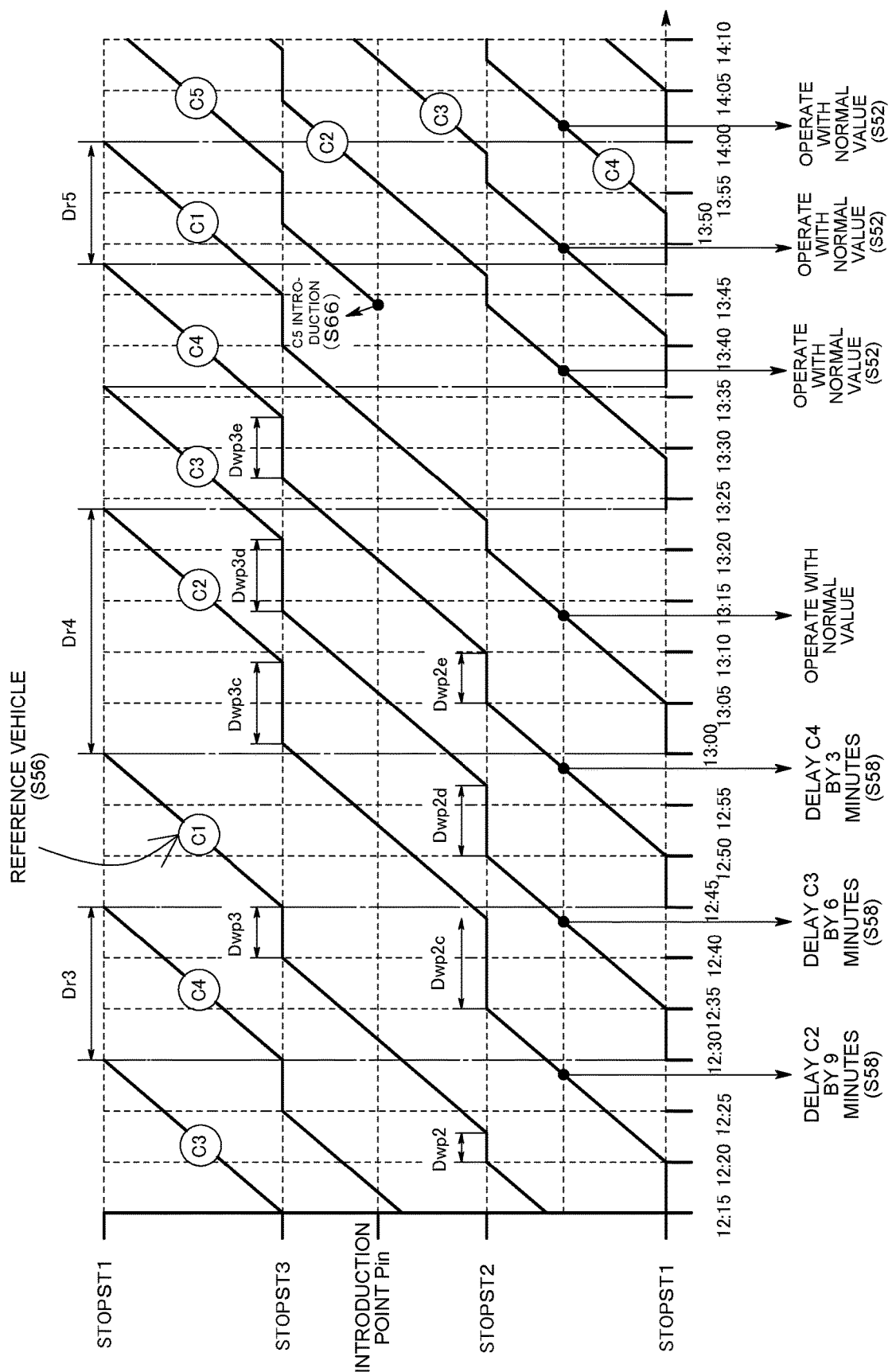
FIG. 16 shows a diagram exemplifying a pre-introduction change process.

FIG. 16 shows a diagram for explaining the pre-introduction change process. In the exemplified configuration, an operation diagram with a lap of 60 minutes, the number of vehicles of 4, and an operation interval of 15 minutes is changed to an operation diagram with a lap of 60 minutes, the number of vehicles of 5, and an operation interval of 12 minutes.

As shown in FIG. 11, when it is judged in step S44 that the maximum value Max(Dra) of the actual operation intervals Dra is less than the interval threshold Dr_th, the hold command is output from the introduction timing determiner 69 to the additional vehicle C5 (S54). Upon reception of the command, the additional vehicle C5 waits in the shed 110.

The hold command is sent, in addition to the additional vehicle C5, to the operation schedule changer 61. When the operation schedule changer 61 receives the hold command, the operation schedule changer 61 changes the departure target times Td* so that the operation intervals of the plurality of operating vehicles C1~C4 become unequal intervals. More specifically, the operation schedule changer 61 changes the departure target time Td* from the departure target time Td* determined based on the normal operation schedule, so that the inter-vehicle space between predetermined operating vehicles is enlarged for the additional vehicle C5.

For example, the operation schedule changer 61 executes a delay change process in which one of the operating vehicles C1~C4 is set as a reference vehicle, and the departure target time Td* of each of the remaining operating vehicles which follow the reference vehicle is delayed from the departure target time Td* determined based on the normal operation schedule. According to this process, an inter-vehicle distance between the reference vehicle and an operating vehicle which follows the reference vehicle can be enlarged, and introduction of the additional vehicle C5 in the inter-vehicle space can be enabled.

The operation schedule changer 61 sets, of a pair of operating vehicles having the maximum value Max(Dra) as the actual operation interval Dra, that is, of the operating vehicles C1 and C2 in the example configuration of FIG. 16, the operating vehicle C1 which is a preceding operating vehicle as a reference vehicle (S56). Further, the operation schedule changer 61 delays the operation schedules of the operating vehicles C2~C4 other than the reference vehicle C1, in comparison to the normal operation schedule, for one lap (S58).

More specifically, the departure target times Td* of the operating vehicles C2~C4 are respectively delayed from the departure target times Td* determined based on the normal operation schedule. With this process, the inter-vehicle space between the reference vehicle C1 and the operating vehicle C2 following the reference vehicle C1 is enlarged, and the additional vehicle C5 is then introduced to this inter-vehicle space (refer to time around 13:43).

The normal operation schedule is basically applied to the operating vehicle C1 which is the reference vehicle before and after the introduction of the additional vehicle C5 to the circuit 100. Alternatively, an advancement or a delay of a slight time may be applied to the schedule.

In the example configuration of FIG. 16, the operation interval of the operating vehicles C1~C4 is shortened from 15 minutes to 12 minutes. That is, the operation schedule is shortened by 3 minutes for each vehicle. For example, for the operation vehicle C2 following the reference vehicle C1 as a next vehicle, the operation schedule is delayed by 9 minutes, accumulating the delay times of 3 minutes for the operating vehicles C3 and C4 following the operating vehicle C2 and the delay time of 3 minutes for the operating vehicle C2. As shown in FIG. 14, this delay is executed by pushing back the departure target times Td* at the stops ST1~ST3 from the departure target times Td* determined based on the normal operation schedule.

For the operating vehicle C3 following the operating vehicle C2 as a next vehicle, the operation schedule is pushed back by a total of 6 minutes, adding the delay of the operating vehicle C4 following the operating vehicle C3 to the delay of the operating vehicle C3. For the last operating vehicle C4, the operation schedule is pushed back by 3 minutes, corresponding to the push back of the operating vehicle C4.

Because the push-back magnitude for each of the operating vehicles C2~C4 is a value per lap of the circuit 100, the advancement magnitude and the push-back magnitude may be distributed over the stops. For example, an even push-back magnitude may be applied to each of the departure target times at the stops ST1~ST3. Alternatively, the push-back magnitude at each of the stops ST1~ST3 may be determined according to a track record value of the delay time Dw at a past lap.

With the application of one lap of the operation schedule to which the delay change process is applied to the operating vehicles C2~C4, the diagram of unequal interval as shown in FIG. 16 may be corrected to the diagram of the equal interval as shown in FIG. 9. For example, when the operating vehicle C2, which is a following vehicle of the pair of operating vehicles forming the inter-vehicle space for introducing the additional vehicle C5, again reaches the operation schedule updating point Pu (around 13:37), the introduction timing determiner 69 determines the actual operation intervals Dra of the operating vehicles C. The introduction timing determiner 69 further determines the maximum value Max(Dra) of the actual operation intervals Dra of the operating vehicles C (S60). Next, the introduction timing determiner 69 judges whether or not the maximum value Max(Dra) of the actual operation intervals Dra is greater than or equal to the interval threshold Dr_th (S62).

When the actual operation situation of the operating vehicles C1~C4 is deviated from the operation schedule after the delay change process, for example, when a delay is caused in the reference vehicle C1, there is a possibility that the maximum value Max(Dra) of the actual operation interval Dra will become less than the interval threshold Dr_th. Thus, in this step, the presence or absence of such a deviation is judged.

When it is judged in step S62 that the maximum value Max(Dra) of the actual operation intervals Dra is greater than or equal to the interval threshold Dr_th, the introduction timing determiner 69 cancels the hold command, and outputs the introduction command to the additional vehicle C4. In parallel to this, the normal operation schedule from the introduction point Pin to the operation schedule updating point Pu is provided from the operation schedule provider 63 to the additional vehicle C5.

In this process, the introduction timing from the introduction point Pin to the circuit 100 is determined to be between the pair of operating vehicles having the maximum value Max(Dra) as the actual operation intervals Dra. For example, in FIG. 16, the pair of operating vehicles C1 and C2 are selected.

For example, the introduction time of the additional vehicle C5 (near 13:43) is determined between a time when the preceding operating vehicle C1, of the operating vehicle C1 and C2, passes the introduction point Pin, and a time when the following operating vehicle C2 passes the introduction point Pin. When the additional vehicle C5 is added between the operating vehicles C1 and C2 (S66), the normal operation schedule is applied to all of the operating vehicles C1~C5, including the additional vehicle C5 (S52).

On the other hand, when it is judged in step S62 that the maximum value Max(Dra) of the actual operation intervals Dra is less than the interval threshold Dr_th, the introduction timing determiner 69 judges that the introduction of the additional vehicle C5 to the circuit 100 is not possible. The introduction timing determiner 69 further displays an alert of introduction impossibility on the display 10I (refer to FIG. 2) (S64). After this process, the normal operation schedule is applied to the operating vehicles C1~C5 (S52).

<Alternative Configuration of Schedule Change>

In the above-described embodiment, the application of the schedule changed from the normal operation schedule is limited to one lap of the circuit 100, but the operation management apparatus of the present disclosure is not limited to such a configuration. For example, the changed schedule may be applied for a plurality of laps. For example, when the advancement magnitude for a predetermined operating vehicle is 9 minutes, the advancement process may be executed over 3 laps, 3 minutes per lap.

The present disclosure is not limited to the present embodiments described above, and includes all changes and modifications without departing from the technical scope or the essence of the present disclosure defined by the claims.

The invention claimed is:

1. An operation management apparatus of a plurality of autonomous travel vehicles which autonomously travel on a circuit, the operation management apparatus comprising:
   a processor that is configured to:
      provide, to each of a plurality of operating vehicles which are autonomously traveling on the circuit, a normal operation schedule in which an arrival target time and a departure target time to and from each stop provided along the circuit and a target velocity of each of the operating vehicle are determined so that operation intervals of the plurality of operating vehicles are an equal interval to each other;

judge necessity of introduction of an additional vehicle to the circuit based on a boarding demand on the circuit, and that output an introduction request command when judging that the introduction is necessary; and output, upon reception of the introduction request command, an introduction command to the additional vehicle when a maximum value of actual operation intervals of the operating vehicles is greater than or equal to an interval threshold determined in direct proportion to the target velocity, and output a hold command to the additional vehicle for putting the introduction to the circuit on-hold when the maximum value is less than the interval threshold; and change an operation schedule to be provided to each of the plurality of operating vehicles from the normal operation schedule, wherein when a loading/unloading completion time of the operating vehicle is before the departure target time at a stop, the operating vehicle waits at the stop until the departure target time, in which case, wait time is a positive value, the wait time is a time period obtained by subtracting, from a stop target time, an actual loading/unloading time, the stop target time being a time period from an actual arrive time at the stop to the departure target time, and the actual loading/unloading time being a time period from the actual arrive time to the loading/unloading completion time, the processor obtains the wait time for each of the operating vehicles at each stop in an immediately preceding lap, the processor executes a post-introduction change process in which the departure target time of an operating vehicle which is one vehicle preceding the additional vehicle introduced to the circuit based on the introduction command is advanced from the departure target time determined based on the normal operation schedule, and the departure target time of an operating vehicle which is one vehicle following the additional vehicle is delayed from the departure target time determined based on the normal operation schedule, and in advancing the departure target time, the processor applies a larger advancement magnitude of the departure target time to a stop having a relatively longer wait time, than to a stop having a shorter wait time.

2. An operation management method of a plurality of autonomous travel vehicles which autonomously travel on a circuit, the method comprising:

providing, to each of a plurality of operating vehicles which are autonomously traveling on the circuit, a normal operation schedule in which an arrival target time and a departure target time to and from a each stop provided along the circuit and a target velocity of each of the operating vehicles are determined so that operation intervals of the plurality of operating vehicles are equal intervals;

judging necessity of introduction of an additional vehicle to the circuit based on a boarding demand on the circuit, and outputting an introduction request command when it is judged that the introduction is necessary; and upon receiving the introduction request command, outputting an introduction command to the additional vehicle when a maximum value of actual operation intervals of the operating vehicles is greater than or equal to an interval threshold determined in direction proportion to the target velocity, and outputting a hold command to the additional vehicle for putting the introduction to the circuit on-hold when the maximum value is less than the interval threshold, wherein:

when a loading/unloading completion time of the operating vehicle is before the departure target time at a stop, the operating vehicle waits at the stop until the departure target time, in which case, wait time is a positive value, the wait time is a time period obtained by subtracting, from a stop target time, an actual loading/unloading time, the stop target time being a time period from an actual arrive time at the stop to the departure target time, and the actual loading/unloading time being a time period from the actual arrive time to the loading/unloading completion time, and the processor obtains the wait time for each of the operating vehicles in an immediately preceding lap at each stop, the operation management method further comprises:

executing a post-introduction change process in which the departure target time of an operating vehicle which is one vehicle preceding the additional vehicle introduced to the circuit based on the introduction command is advanced from the departure target time determined based on the normal operation schedule, and the departure target time of an operating vehicle which is one vehicle following the additional vehicle is delayed from the departure target time determined based on the normal operation schedule, and in advancing the departure target time, the processor applies a larger advancement magnitude of the departure target time to a stop having a longer wait time, than to a stop having a short wait time.

* * * * *